US012795550B2

(12) United States Patent
Arngren et al.

(10) Patent No.: US 12,795,550 B2
(45) Date of Patent: Nov. 10, 2026

(54) PROVIDING A COMMUNICATION SERVICE THROUGH I/O DEVICES TO A USER

(71) Applicant: Telefonaktiebolaget LM Ericsson (publ), Stockholm (SE)

(72) Inventors: Tommy Arngren, Södra Sunderbyn (SE); Peter Ökvist, Luleå (SE); Hans Hannu, Luleå (SE); Adam Bergkvist, Luleå (SE); Daniel Lindström, Luleå (SE); Stefan Wänstedt, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 379 days.

(21) Appl. No.: 18/565,633

(22) PCT Filed: Jun. 22, 2021

(86) PCT No.: PCT/EP2021/066977

§ 371 (c)(1),
(2) Date: Nov. 30, 2023

(87) PCT Pub. No.: WO2022/268298

PCT Pub. Date: Dec. 29, 2022

(65) Prior Publication Data

US 2024/0259946 A1 Aug. 1, 2024

(51) Int. Cl.
*H04W 52/02* (2009.01)
*H04W 76/28* (2018.01)

(52) U.S. Cl.
CPC ... *H04W 52/0248* (2013.01); *H04W 52/0261* (2013.01); *H04W 76/28* (2018.02)

(58) Field of Classification Search
CPC ......... H04W 52/0248; H04W 52/0261; H04W 76/28
See application file for complete search history.

(56) References Cited

U.S. PATENT DOCUMENTS

| | | | |
|---|---|---|---|
| 9,224,290 B1 | 12/2015 | Mason et al. | |
| 2013/0137432 A1 | 5/2013 | Wong | |

(Continued)

FOREIGN PATENT DOCUMENTS

| | | | |
|---|---|---|---|
| CN | 104540200 A * | 4/2015 | ........ H04W 52/0206 |
| EP | 3214555 B1 | 12/2019 | |

(Continued)

OTHER PUBLICATIONS

Office Action for Japanese Patent Application No. 2023-578882 dated Jan. 28, 2025, including English translation, 4 pages.

(Continued)

*Primary Examiner* — Derrick V Rose
(74) *Attorney, Agent, or Firm* — Sage Patent Group

(57) ABSTRACT

A user terminal emulation server for providing a communication service through one or more input and/or output (I/O) user devices to a user. The user terminal emulation server is configured to register user information with a network entity providing the communication service, and predict likelihood the user will become proximately located to an I/O user device. The user terminal emulation server is further configured to determine discontinuous reception (DRX) settings based on the predicted likelihood the user will become proximately located to the I/O user device, and to configure the I/O user device to use the DRX settings for receiving downlink radio communications from a radio access network (RAN) which are related to the communication service. Related methods and computer program products are disclosed.

26 Claims, 10 Drawing Sheets

(56) References Cited

U.S. PATENT DOCUMENTS

| | | | |
|---|---|---|---|
| 2014/0254451 A1 | 9/2014 | Jamadagni et al. | |
| 2016/0021684 A1* | 1/2016 | Lewis | H04W 4/80 370/329 |
| 2017/0208363 A1 | 7/2017 | Glazier et al. | |
| 2017/0242995 A1* | 8/2017 | Bassenye-Mukasa | G06F 16/24575 |
| 2018/0146430 A1 | 5/2018 | Yadav et al. | |
| 2018/0348844 A1* | 12/2018 | Lingutla | G06F 1/3209 |
| 2019/0028971 A1 | 1/2019 | Wang | |
| 2019/0053199 A1* | 2/2019 | Fujishiro | H04W 76/11 |
| 2019/0223229 A1 | 7/2019 | Sharma et al. | |
| 2024/0064849 A1* | 2/2024 | Mohammad Soleymani | H04W 76/28 |

FOREIGN PATENT DOCUMENTS

| | | | |
|---|---|---|---|
| JP | 2013-531903 A | 8/2013 | |
| WO | WO-2019232807 A1 * | 12/2019 | H04L 1/0023 |
| WO | 2020147924 A1 | 7/2020 | |
| WO | 2020224746 A1 | 11/2020 | |
| WO | 2020253961 A1 | 12/2020 | |
| WO | 2022258147 A1 | 12/2022 | |

OTHER PUBLICATIONS

International Search Report and Written Opinion of the International Searching Authority, PCT/EP2021/066977, mailed Mar. 4, 2022, 15 pages.

3GPP TS 38.331 V16.4.1 (Mar. 2021); 3rd Generation Partnership Project; Technical Specification Group Radio Access Network; NR; Radio Resource Control (RRC) protocol specification (Release 16), 949 pages.

3GPP TS 38.213 V16.5.0 (Mar. 2021); 3rd Generation Partnership Project; Technical Specification Group Radio Access Network; NR; Physical layer procedures for control (Release 16), 183 pages.

3GPP TS 38.321 V16.4.0 (Mar. 2021); 3rd Generation Partnership Project; Technical Specification Group Radio Access Network; NR; Medium Access Control (MAC) protocol specification (Release 16), 157 pages.

* cited by examiner

PROVIDING A COMMUNICATION SERVICE THROUGH I/O DEVICES TO A USER

CROSS REFERENCE TO RELATED APPLICATIONS

This application is a 35 U.S.C. § 371 national stage application of PCT International Application No. PCT/EP2021/066977 filed on Jun. 22, 2021, the disclosure and content of which is incorporated by reference herein in its entirety.

TECHNICAL FIELD

The present disclosure relates to a user terminal emulation server for providing a communication service through one or more input and/or output (I/O) user devices to a user, a method of a user terminal emulation server for providing a communication service through one or more I/O user devices to a user, and a corresponding computer program product.

BACKGROUND

The market for user terminals is driven by the desire to provide users with increasingly advanced communication capabilities and other operational features within the constraints of a portable handheld form factor. The development requirements for user terminal are increasingly complex as designers seek to integrate a greater variety of user interfaces and advanced operational features within the portable handheld form factor. Advancements in operational features have required more highly integrated and faster processing circuits with greater circuit densities, which becomes more difficult under constraints on costs and power consumption.

This all-inclusive feature-rich approach for user terminal development does not satisfy all of the myriad of differing desires held by consumers. Moreover, the always-connected expectations of today's society obligates users to vigilantly keep their user terminals within reach or risk being unable to timely receive or initiate communication services.

Some approaches have been proposed which seek to replace the conventional user terminal with other types of user interfaces which can interface with server based services. For example, Sun Microsystems has proposed thin client stateless terminals through any one of which a user can access a user application executed by a server. The terminals include an integrated smart card reader which operates to authenticate users and enable a user to remove a smart card (logging the user off one terminal) to pause a session and subsequently insert the smart card into any other terminal (logging the user on the other terminal) to promptly resume the session from where the user left off.

SUMMARY

Various embodiments disclosed herein are directed to providing an approach for server based emulation of a user terminal using connectable input and/or output (I/O) user devices which are configured to use discontinuous reception (DRX) settings for receiving downlink radio communications from a radio access network (RAN) related to a communication service, and where the DRX settings are determined based on predicted likelihood a user will become proximately located to respective ones of the I/O user device.

Some embodiments are directed to a user terminal emulation server for providing a communication service through one or more I/O user devices to a user. The user terminal emulation server is configured to register user information with a network entity providing the communication service, and predict likelihood the user will become proximately located to an I/O user device. The user terminal emulation server is further configured to determine DRX settings based on the predicted likelihood the user will become proximately located to the I/O user device, and to configure the I/O user device to use the DRX settings for receiving downlink radio communications from a radio access network (RAN) which are related to the communication service.

Some other related embodiments are directed to a method of a user terminal emulation server for providing a communication service through one or more I/O user devices to a user. The method includes registering user information with a network entity providing the communication service, and predicting likelihood the user will become proximately located to an I/O user device. The method further includes determining DRX settings based on the predicted likelihood the user will become proximately located to the I/O user device, and configuring the I/O user device to use the DRX settings for receiving downlink radio communications from a RAN which are related to the communication service.

Some other related embodiments are directed to a computer program product includes a non-transitory computer readable medium storing program instructions executable by at least one processor of a user terminal emulation server to perform operations for providing a communication service through one or more I/O user devices to a user. The operations include registering user information with a network entity providing the communication service, and predicting likelihood the user will become proximately located to an I/O user device. The operations further include DRX settings based on the predicted likelihood the user will become proximately located to the I/O user device, and configuring the I/O user device to use the DRX settings for receiving downlink radio communications from a RAN which are related to the communication service.

Some potential advantages of these and other embodiments herein include that the user terminal emulation server can actively manage power consumption and responsiveness of one or more I/O user devices to downlink communications from a RAN while not yet being used for a communication service, based on whether and/or how likely the user is to become proximately located to the one or more I/O user devices. Example communication services that can be provided by a network entity through one or more I/O user devices can include, without limitation, Voice over IP and/or Video Over IP calling (e.g., Skype, Microsoft Teams, etc.), streaming media (e.g., Netflix, HBO, Hulu, etc.), online gaming, etc. The I/O user device can include, without limitation, wireless discontinuous reception (DRX) capable (e.g., 3GPP LTE and/or 5G New Radio capable) televisions, display monitors, conference phones, speakerphone and/or display device of connected cars, stand-alone speakers, stand-alone microphones, surveillance cameras, smart household appliances (e.g., display device on refrigerator or thermostat), keyboards, etc., which are becoming ubiquitous nearly everywhere pursuant to the Internet of Things (IoT) revolution. An I/O user device can operate in a DRX mode cycling between a lower power consumption mode, during which the I/O user device cannot receive downlink radio communications from the RAN, and a higher power consumption mode, during which the I/O user device can receive downlink radio communications from the RAN. The user terminal emulation server controls the DRX settings used by the I/O user device based on the predicted likelihood the user will become proximately located to the I/O user device. For example, the user terminal emulation server can configure the DRX settings to increase the frequency of downlink reception opportunities based on a higher likelihood the user will become proximately located to the I/O user device, e.g., within a threshold time duration, and to decrease the frequency of active reception opportunities based on a lower likelihood the user will become proximately located to the I/O user device. Thus, as a user approaches the I/O user device, the user terminal emulation server can change the DRX settings to enable the I/O user device to more quickly receive and use downlink transmissions from the RAN. Actively managing the DRX settings of the I/O user device in this manner may: 1) optimize power consumption, thereby extending operational life of the I/O user device on battery power; 2) optimize consumption of processing and memory resources used for monitoring downlink RAN communications; and 3) reduce air interface signalling by enabling faster transition into DRX mode which reduces measurement signaling from the UE to the network.

Other servers, methods, and corresponding computer program products according to embodiments of the inventive subject matter will be or become apparent to one with skill in the art upon review of the following drawings and detailed description. It is intended that all such additional servers, methods, and corresponding computer program products be included within this description, be within the scope of the present inventive subject matter, and be protected by the accompanying claims. Moreover, it is intended that all embodiments disclosed herein can be implemented separately or combined in any way and/or combination

BRIEF DESCRIPTION OF THE DRAWINGS

Aspects of the present disclosure are illustrated by way of example and are not limited by the accompanying drawings. In the drawings.

DETAILED DESCRIPTION

Figure 1:
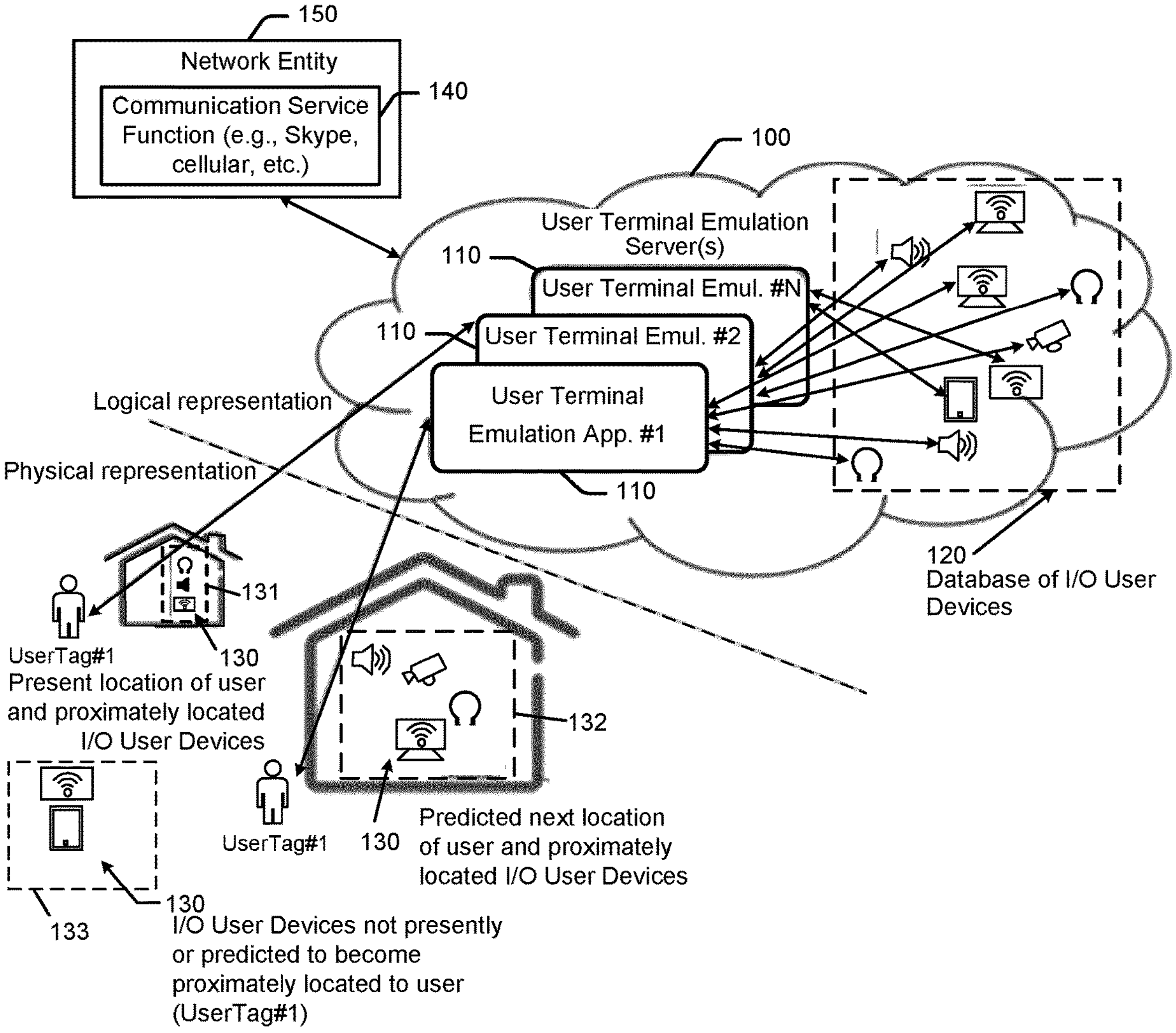
FIG. 1 illustrates a system with a user terminal emulation server that operationally integrates sets of I/O user devices that are proximately located to users to logically form virtualized user terminals providing communication services in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Various embodiments disclosed herein are directed to providing a user terminal emulation server, e.g., as a cloud computing resource, which emulates a user terminal using individual I/O user devices or a set of I/O user devices that are proximately located to a user and have requisite user interface (UI) capabilities to provide a user with the ability to use a communication service provided by a network entity. These embodiments can predict the likelihood that the user will become proximately located to an I/O user device or a set of I/O user devices. Upon arrival of the user, the I/O user device or the group of I/O user devices can be used to provide the communication service of the network entity for the user or can more instantaneously be made available for providing the communication service.

A user can receive and initiate communication services without the necessity of a traditional all-inclusive feature-rich user terminal, i.e., a conventional smartphone, mobile phone, tablet computer, etc. The user terminal emulation server can adaptively combine the available UI capabilities of I/O user devices that are predicted to become proximately located to a user to support provision of a communication service to the user before the user becomes proximately located to the I/O user devices. Dynamic allocation of I/O user interface capabilities of I/O user devices whenever and wherever they are predicted to become proximately located to a user enables efficient and flexible use of existing hardware, such as televisions, display monitors, conference phones, speakerphone and/or display device of connected cars, stand-alone speakers, stand-alone microphones, surveillance cameras, smart household appliances (e.g., display device on refrigerator or thermostat), keyboards, etc. that is capable of providing some UI functionality to a user during a communication service. The user thereby has reduced need or no need to carry an expensive and all-inclusive user terminal, e.g. smartphone, that includes all necessary UI capabilities, display device, keyboard, speakers, etc. The user may instead carry a hardware device which operates to identify the user, referred to as a "UserTag", over a wireless communication interface, such as a near field communication (NFC) interface, to one or more of the I/O user devices.

Various embodiments disclosed herein may disrupt the traditional handset-centric mobile communication industry as the features and capabilities of what forms a user terminal are not constrained to the domain of mobile phone manufacturers. A user terminal emulation server can operate to provide a software-based user terminal, which can also be referred to as a SoftUE or a user terminal emulation application that is run by the user terminal emulation server.

In accordance with various 3GPP LTE standards a user device, also called a user equipment (UE) in 3GPP standards, must monitor PDCCH (physical downlink control channel) for every subframe as it has no information as to how or when a radio access network (RAN) will transmit any downlink data for receipt by the user equipment. One approach which enables the user equipment to save energy is to operate in discontinuous reception (DRX), whereby the user device alternates between a lower power consumption mode (also referred to as sleep mode) for a certain period of time, and a higher power consumption mode (also referred to as wake up mode) for another period of time, controlled by the RAN. During the lower power consumption mode time (e.g., sleep mode), the user device cannot receive downlink radio communications from the RAN (e.g., user device's transceiver circuitry is powered-off). In contrast, during the higher power consumption mode (e.g., wake up mode) the user device can receive downlink radio communications from the RAN (e.g., user device monitors downlink radio communications from the RAN through the transceiver circuitry).

Various embodiments of the present disclosure are further directed to actively managing power consumption and responsiveness of one or more I/O user devices to downlink communications from a RAN such as when not yet being used by a user for a communication service, based on whether and/or how likely the user is to become proximately located to the one or more I/O user devices. In some embodiments, the user terminal emulation server determines DRX settings based on the predicted likelihood the user will become proximately located to the I/O user device, and configures the I/O user device to use the DRX settings for receiving downlink radio communications from a RAN which are related to a communication service. The user terminal emulation server may configure DRX settings for an I/O user device to increase the frequency of downlink reception opportunities based on a higher likelihood the user will become proximately located to the I/O user device, e.g., within a threshold time duration, and decrease the frequency of active reception opportunities based on a lower likelihood the user will become proximately located to the I/O user device. Thus as a user approaches the I/O user device, the user terminal emulation server can predict the increasing likelihood that the user will become proximately located to the I/O user device and responsibly change the DRX settings to increase the frequency and/or time durations during which the I/O user device is available to receive downlink radio communications from the RAN so as to enable the I/O user device to more quickly receive and use downlink transmissions from the RAN. Actively managing the DRX settings of the I/O user device in this manner may: 1) optimize power consumption, thereby extending operation of the I/O user device on battery power; 2) optimize processing and memory resource consumption used for monitoring downlink RAN communications; and 3) reduce air interface signalling by enabling faster transition into DRX mode which reduces measurement signaling from the UE to the network.

Figure 11:
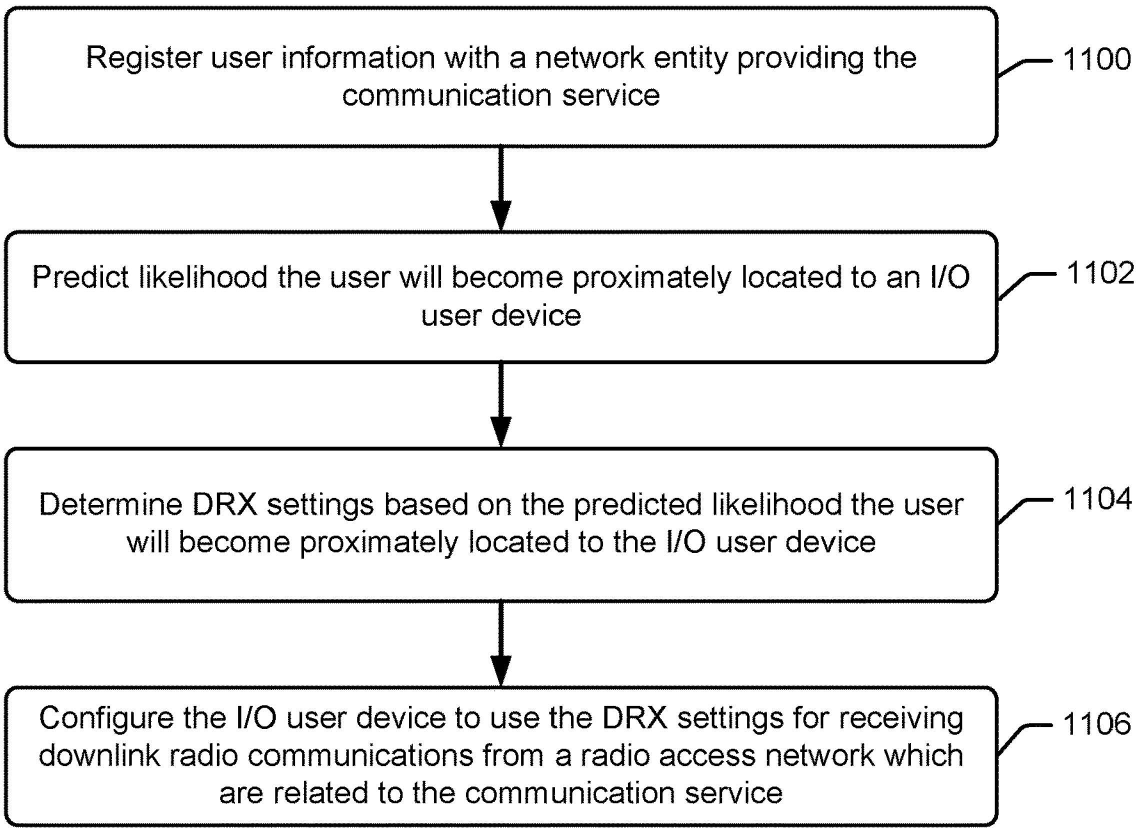
FIGS. 11 and 12 are flowcharts of operations that may be performed by a user terminal emulation server to determine DRX settings for one or more I/O user devices and to configure the one or more I/O user devices to use the DRX settings for receiving downlink radio communications from a radio access network relating to a communication service, in accordance with some embodiments of the present disclosure.

FIG. 1 illustrates a system with a user terminal emulation server 100 that operationally uses individual I/O user devices 130 or integrated sets of I/O user devices 130 which are proximately located to users to logically emulate user terminals providing communication services through one or more network entities 150 in accordance with some embodiments of the present disclosure. FIG. 11 is a flowchart of operations that may be performed by the user terminal emulation server 100 to determine DRX settings based on a predicted likelihood the user will become proximately located to the I/O user device(s) 130, and to configure the I/O user device(s) 130 to use the DRX settings for receiving downlink radio communications from a RAN (220 FIG. 2) which are related to the communication service.

Referring to FIGS. 1 and 11, the user terminal emulation server 100 may be a cloud computing resource that is remotely networked to the I/O user devices 130, or may be more proximately located on a shared network with the I/O user devices 130, e.g., in an edge computing resource. The user terminal emulation server 100 is configured to register 1100 user information with a network entity 150 that provides communication services for the user. As will be explained in more detail below, the user information may include, but is not limited to, any one or more of a user identifier, user credentials for accessing a communication service (e.g., user ID and password), phone number, Mobile Subscriber Identification Number (MSIN), a network address of a user terminal emulation application 110 associated with the user, etc. Example communication service functions 142 provided by the network entity 150 can include, but are not limited to, Voice over IP and/or Video Over IP conferencing services (e.g., Skype, Microsoft Teams, etc.), streaming media services (e.g., Netflix, HBO, Hulu, etc.), gaming service (e.g., online game application), etc.

The user terminal emulation server 100 is further configured to predict 1102 likelihood the user will become proximately located to one or more I/O user devices 130, and to determine 1104 DRX settings based on the predicted likelihood the user will become proximately located to the one or more I/O user devices 130. The user terminal emulation server 100 configures 1106 the one or more I/O user devices 130 to use the DRX settings for receiving downlink radio communications from a RAN (220 in FIG. 2) which are related to the communication service. Example types of DRX settings are explained further below.

Users may carry a hardware tag, a.k.a. "UserTag" in FIG. 1, which is capable of transmitting a unique user identifier through a communications interface, such as a near-field communications interface (e.g., Bluetooth, Bluetooth low energy (BLE), near field communication (NFC), RFID, etc., or combinations thereof), for receipt by one or more of the I/O user devices 130 which are proximately located to the user. One type of UserTag can be a simple stand-alone electronic device having limited capability for transmitting an identifier through a near-field communications interface. Another type of UserTag can be a smartphone or smartwatch having cellular connectivity that transmits a cellular identity (e.g., from a SIM card) or an application identity through a cellular interface or a near-field communications interface.

In one example embodiment which will be explained in further detail below, the user terminal emulation server 100 can operate to provide seamless handoff of a videoconference service that is presently being provided to a first user through the network entity 150 from a first I/O user device 130 to a second I/O user device 130, e.g., as the first user walks down a building corridor. For example, the first I/O user device 130 may be located at an entrance to the building corridor and the second I/O user device 130 may be located further down the building corridor. The user terminal emulation server 100 determines that the first user is presently proximately located to the first I/O user device 130 based on receiving a report from the first I/O user device 130 which provides the sensed UserTag #1 identifier associated with the first user. Responsive to an incoming request from the network entity 150 or from the first user to establish a videoconference service, the user terminal emulation server 100 uses the I/O user interface of the first I/O user device 130 to provide the videoconference service.

The user terminal emulation server 100 predicts a likelihood that the user will become proximately located to the second I/O user device 130, such as based on being configured to know relative locations of the first and second I/O user devices 130 and/or from learning that users have historically been observed to become proximately located to the second I/O user device 130 within a threshold amount of time after being proximately located to the first I/O user device 130. Alternatively or additionally, the user terminal emulation server 100 may predict the likelihood that the user will become proximately located to the second I/O user device 130 based on being informed of a location of the user by a satellite-based positioning system (e.g., GNSS, GPS, etc.), cellular-based positioning system, etc., and/or based on obtaining user movement information indicating speed of user movement and/or direction of user movement relative to the I/O user devices 130, etc.

The term "proximately located" is used in a non-limiting manner to refer to, for example, when a user becomes sufficiently closely located to an I/O user device to be able to use one or more user interface (UI) capabilities of the I/O user device. For example, a user can be determined to be proximately located to a loudspeaker when the user is predicted to be within an audible range of the loudspeaker, which can depend upon the output volume capability of the loudspeaker. Similarly, a user can be determined to be proximately located to a camera when the user is predicted to be within a field-of-view and/or within a range of the camera for which the user can be resolved from other objects within a video stream from the camera. In contrast, a user can be determined to be proximately located to these or other I/O user devices when the user is predicted to be within a defined distance from the I/O user device or to be within a threshold time of reaching the I/O user device.

Although some embodiments are described in the context of the user moving relative to the I/O user devices 130, in some other embodiments one or more of the I/O user devices 130 move relative to the user. For example, a camera and/or microphone of a flying or land-moving drone can operate to send an uplink video stream and/or microphone audio stream of the user through a RAN to the communication service function 140 of the network entity 150 during an on-line conference meeting. Similarly, a loudspeaker of a flying or land-moving drone can operate to playout a downlink audio stream to the user which is received through the RAN from the communication service function 140 of the network entity 150 during the on-line conference meeting.

The user terminal emulation server 100 can determine that the second I/O user device 130 has an I/O user interface that satisfies a capability criterion to enable the first user to use the videoconference service provided by the network entity 150, and can signal the second I/O user device 130 to prepare for using the I/O user interface to provide the videoconference service for the first user. The user terminal emulation server 100 may initiate routing of videoconference service traffic to the second I/O user device 130 before the first user is predicted to become proximately located to the second I/O user device 130, or may initiate the routing responsive to being informed that the user is become proximately located to the second I/O user device 130. The second I/O user device 130 may perform one of the following operations with the videoconference service traffic: initiate playout of the videoconference service traffic through the I/O user interface; buffer the videoconference service traffic for subsequent playout through the I/O user interface responsive to the user becoming proximately located to the second I/O user device 130; and discard the videoconference service traffic until the user becomes proximately located to the second I/O user device 130. Alternatively, the user terminal emulation server 100 may initiate routing of videoconference service traffic to the second I/O user device 130 responsive to being informed that the user has become proximately located to the second I/O user device 130.

In the illustrated example of FIG. 1, the user terminal emulation server 100 receives a report from one of the I/O user devices 130 in area 131 indicating that UserTag #1 associated with the user is presently proximately located to that I/O user device 130. The user terminal emulation server 100 may responsibly identify a set of I/O user devices that are presently located proximately to the user. The user terminal emulation server 100 can also predict that that the user is likely to become proximately located to a set of other I/O user devices 130 in the area 132, e.g., within a threshold time, based on one or more operations disclosed below for predicting likelihood that a user will become proximately located to I/O user devices. The user terminal emulation server 100 may also identify in area 133 a set of I/O user devices 130 that the user is not predicted to become proximately located to.

The identity of the user may additionally or alternatively be operationally determined using biometrics operations performed by, e.g., one or more of the I/O user devices 130. The biometrics operations may include, without limitation, one or more of voice recognition, image/face recognition, eye recognition, fingerprint recognition, or a combination thereof. The user identity may be determined based on a credential provided by the user when, e.g., logging into an application or account. The user identity may be determined from information provided by a cell phone, such as from the subscription SIM, and the user's proximity of the cell phone to one or more of the I/O user devices 130 can be determined using the phone's near-field communications (NFC) capability.

A user identifier (e.g., UserTag identifier) and a user terminal application can be logically associated with each other in a database repository 120 during a user registration process or as part of another setup process. For example, during a user registration process a user may obtain an account login identifier (serving as the user identifier) that is registered in the database repository 120 as being associated with a UserTag identifier for a physical UserTag that has been provided to (e.g., purchased by) the user and being associated with a user terminal application that emulates a user terminal having defined capabilities (e.g., a cell phone providing cellular and over-the-top voice-over-IP communication services).

Figure 6:
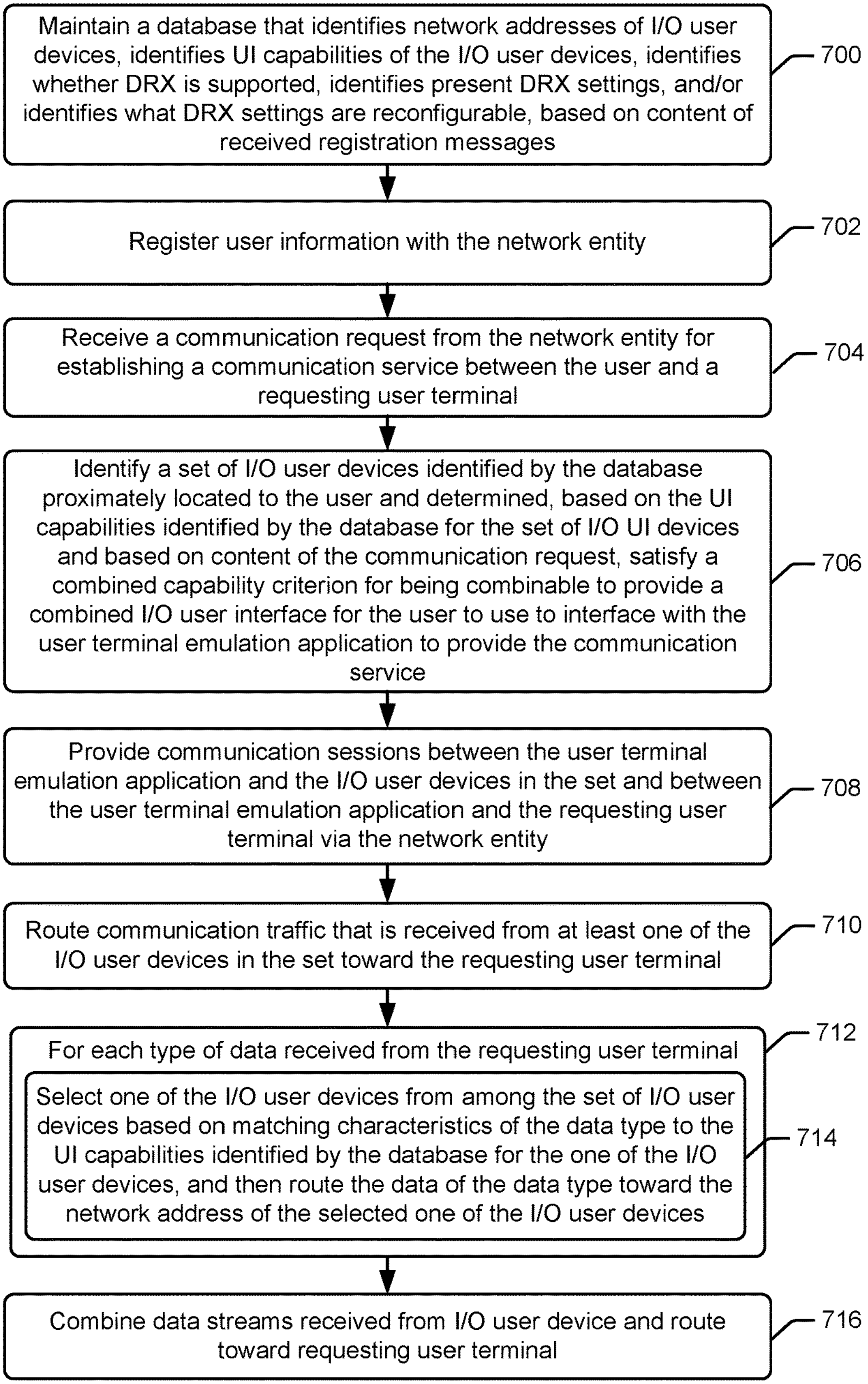
FIGS. 6 and 7 are flowcharts of operations that may be performed by a user terminal emulation server to provide communication services through a set of I/O user devices in accordance with some embodiments of the present disclosure.

Operations that can be performed by the user terminal emulation server 100 to provide communication services to users are described below with further reference to FIG. 6. Referring to FIGS. 1 and 6, the user terminal emulation server 100 maintains 700 a database repository 120 that may identify network addresses of I/O user devices 130 and identify UI capabilities of the I/O user devices 130, based on content of received registration messages. The capabilities of the I/O user devices 130 may be logically arranged in the repository 120 based on the type of UI capability provided, e.g., display device, microphone, ear speaker (e.g., Bluetooth ear speaker), loudspeaker, keyboard, and may be further arranged based on quality of service characteristics provided by the UI capability (e.g., mono or stereo speaker, speaker maximum volume, display screen size, display maximum resolution, etc.). In accordance with various present embodiments, the database repository 130 can identify which of the I/O user devices 130 support DRX (i.e., are capable of DRX operations for receiving downlink radio communications from a RAN), identify present DRX settings configured for an I/O user device 130, and/or identify what DRX settings of the I/O user device 130 are reconfigurable by the user terminal emulation server 100 through the RAN.

An I/O user device 130 may communicate a registration message identifying its network address (e.g., an IP address and port number, MAC address, fully qualified domain name (FQDN), and/or another network address), UI capabilities, present DRX settings, and/or DRX settings which are reconfigurable to the user terminal emulation server 100 responsive to an initial set up operation, to being connected to a new communication network, and/or responsive to another defined event for triggering generation of a registration message. The registration messages may identify a geographic location of the I/O user device 130, which can be stored in the database repository 120. The I/O user devices 130 may communicate with the server 100 via a data network (e.g., Internet and/or private network) using a cellular transceiver (e.g., 3GPP LTE and/or 5G New Radio compatible) and/or another wireless transceiver such as a WiFi transceiver, a Bluetooth transceiver, a light communication transceiver (LiFi), and/or another RF or light communications transceiver.

The user terminal emulation server 100 may, for example, receive the registration messages from the I/O user devices 130 using the Session Initiation Protocol (SIP)/Session Description Protocol (SDP). The I/O user device 130 may respond to becoming powered-on or to occurrence of another defined operational event by communicating the registration message to the user terminal emulation server 100.

The user terminal emulation server 100 registers 702 in FIGS. 6 and 1100 in FIG. 11 user information with the network entity 150 providing communication services. The user information may include any or more of a user identifier, user credentials for accessing a communication service (e.g., user ID and password), phone number, Mobile Subscriber Identification Number, a network address of a user terminal emulation application 110 associated with the user, etc. The network entity 150 provides various communication service functions 140 which may, for example, correspond to an over-the-top Voice Over Internet Protocol (VOIP) service, videoconference service (e.g., Teams, Skype, etc.), media content streaming service (e.g., Netflix, HBO, Hulu, etc.), gaming service (e.g., online game application), a cellular communication service, etc. A user terminal emulation application 110 is executed by the user terminal emulation server 100, and may run one or more applications that are normally run by a smartphone, such as a VOIP service application, a video conference service application, media content streaming application, online game application, cellular communication service, etc.

As illustrated in FIG. 1, in some embodiments a different instantiation of the user terminal emulation application 110 may be hosted by the server 100 for each user who is to be provided communication services (i.e., illustrated user terminal emulation applications #1-#N corresponding to users 1-N). The user terminal emulation application 110 may register and address of one of the user terminal emulation applications that is instantiated for the user with the network entity 150 and subsequently setup a communication service with a user via the user terminal emulation application instantiated for the user.

When the communication service function 140 of the network entity 150 is a VoIP service, the operation to register (702 in FIGS. 6 and 1100 in FIG. 11) user information can include registering the network address of the user terminal emulation application associated with the user and/or the user credentials for accessing the VOIP service with the network entity 150 which may be a network server of a VoIP communication service provider.

When the communication service function 140 of the network entity 150 is a cellular communication service, the operation to register (702 in FIGS. 6 and 1100 in FIG. 11) user information can include registering the network address of the user terminal emulation application associated with the user and/or the user identity (e.g., phone number and/or Mobile Subscriber Identification Number) with the network entity 150 which may be a Home Subscriber Server (HSS) or other network node of a core network operated by a cellular communication service provider.

The user terminal emulation server 100 receives 704 a communication request from the network entity 150 for establishing a communication service between the user and a requesting user terminal, e.g., a cellular phone, computer with on-line meeting application, gaming application server, etc. Responsive to the communication request, the user terminal emulation server 100 identifies 706 a set of I/O user devices among the I/O user devices 130 identified by the repository 120 that are determined to be proximately located to a location of the user or to which the user is predicted to become proximately located. The user terminal emulation server 100 further determines, based on the UI capabilities identified by the repository 120 for the set of I/O user devices and based on content of the communication request, that the set of I/O user devices satisfies a combined capability criterion for being combinable to provide a combined I/O user interface for the user to interface with the user terminal emulation application 110 to provide the communication service.

Based on determining that the set of I/O user devices satisfies the combined capability criterion, the user terminal emulation server 100 provides 708 communication sessions between the user terminal emulation application 110 and the I/O user devices in the set and between the user terminal emulation application 110 and the requesting user terminal via the network entity 150. The communication request that is received 704 by the user terminal emulation application 110 may contain an indication of a minimum UI capability that must be provided to the user during the communication service, such as: loudspeaker only; combination of loudspeaker and microphone; display only; combination of display device, loudspeaker, and microphone; etc. The combined capability criterion which is used by the server 100 to determine whether a communication service can be provided and by which set of I/O user devices, may thereby be defined based on the minimum UI capability that is indicated by the communication request.

The user terminal emulation server 100 then routes 710 communication traffic that is received from at least one of the I/O user devices in the set toward the requesting user terminal via the network entity 150. Further operations are performed 712 for each data type that is received as communication traffic from the requesting user terminal, the operation select 714 one of the I/O user devices from among the set of I/O user devices based on matching characteristics of the data type to the UI capabilities identified by the repository 120 for the one of the I/O user devices, and then routes the data of the data type toward the network address of the selected one of the I/O user devices.

The server 100 may also combine 716 data streams are received from the I/O user devices in the set, and route the combined data streams towards the requesting user terminal, e.g., via the network entity 150.

Figure 7:
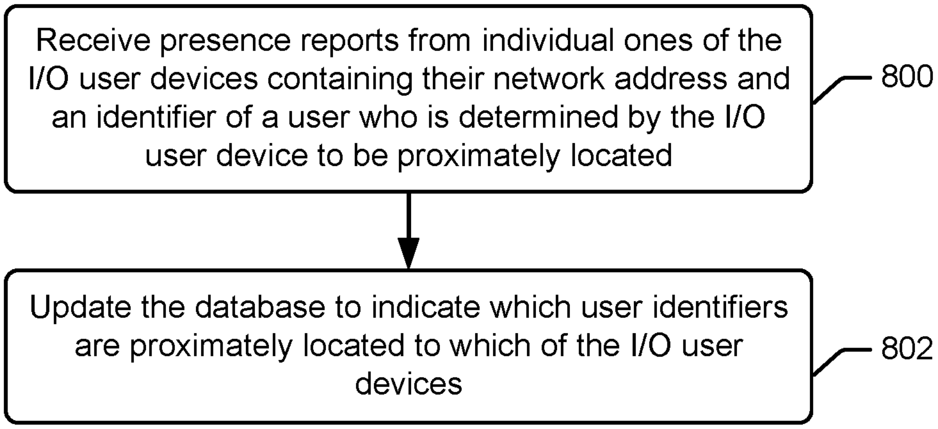

The user terminal emulation server 100 (e.g., the application 110 or an I/O user device handler described below) may be responsible for tracking which I/O user devices are presently proximately located to a present location of the user. FIG. 7 is a flowchart of corresponding operations. The server 100 can receive 800 presence reports from individual ones of the I/O user devices containing their network address and an identifier of a user who is determined by the I/O user device to be proximately located. For example, an I/O user device may read a hardware tag, also referred to herein as a "UserTag", through a NFC communication interface, may sense biometric information from the user, identify the user through facial recognition performed on a video stream from a camera, and/or may perform other operations to detect presence of a user and to identify the user. Responsive to the presence reports, the server 100 updates 802 the repository 120 to indicate which user identifiers are proximately located to which of the I/O user devices.

With further reference to the example system of FIG. 1, the user terminal emulation server 100, via operation of the user terminal emulation application_#1 100, predicts likelihood that the user carrying UserTag #1 will become proximately located to various I/O user devices. For example, the user terminal emulation server predicts that the user has a 100% likelihood of being presently proximately located to a set of I/O user devices 130 in area 131 based on receiving a report from one of the I/O user devices 130 containing an identifier for UserTag #1. The user terminal emulation server 100 can determine a first set of DRX settings for the I/O user devices 130 in area 131 based on the predicted likelihood and configure the I/O user devices 130 in area 131 to operate using the first set of DRX settings. Because the user is predicted to be presently proximately located to the set of I/O user devices in area 131, the first set of DRX settings are configured to cause the I/O user devices 130 in area 131 to, e.g., have a relatively high rate of waking-up to listen for download transmissions from a RAN. Example DRX settings which can be configured for an I/O user device are explained in detail further below.

The user terminal emulation server 100, via operation of the user terminal emulation application_#1 100, can presently use the set of I/O user devices 130 in area 131 to provide a combined I/O user interface for use by the user during a newly initiated incoming communication service, a newly initiated outgoing communication service, or an ongoing established communication service via the network entity 150.

Similarly, the user terminal emulation server predicts that the user has a 75% likelihood of becoming proximately located to another set of I/O user devices 130 in area 132, e.g., within a threshold time, based on the prediction that the user is presently proximately located to area 131 and based on one or more prediction operations described further below. The user terminal emulation server 100 can determine a second set of DRX settings for the I/O user devices 130 in area 132 based on the predicted likelihood and configure the I/O user devices 130 in area 132 to operate using the second set of DRX settings. Because the user is predicted to have a lower likelihood of becoming proximately located to the set of I/O user devices in area 132 and/or becoming proximately located a threshold time in the future, the configured second set of DRX settings can cause the I/O user devices 130 in area 132 to, e.g., have a lower rate of waking-up to listen for download transmissions from a RAN relative to configuration according to the first set of DRX settings.

Similarly, the user terminal emulation server predicts that the user has a 10% likelihood of becoming proximately located to another set of I/O user devices 130 in area 133, e.g., within the threshold time, based on the prediction that the user is presently proximately located to area 131 and based on one or more prediction operations described further below. The user terminal emulation server 100 can determine a third set of DRX settings for the I/O user devices 130 in area 133 based on the predicted likelihood and configure the I/O user devices 130 in area 133 to operate using the third set of DRX settings. Because the user is predicted to have a still lower likelihood of becoming proximately located to the set of I/O user devices in area 133 relative to the set of I/O user devices in area 132, the configured third set of DRX settings can cause the I/O user devices 130 in area 133 to, e.g., have a relatively lower rate of waking-up to listen for download transmissions from a RAN relative to configuration according to the second set of DRX settings.

As explained above, the received 704 communication request which is requesting the establishment of a communication service with an identified user may be initiated by the network entity 150 using the identity of the user, and maybe also using the network address of the user terminal emulation application, which was earlier registered with the network entity 150. However, the communication request may additionally or alternatively be generated by one of the I/O user devices 130 responsive to a command received from a proximately located user. For example, a user may operate a user interface provided by one of the I/O user devices 130 to initiate a combined audio and video call with another user. The user terminal emulation server 100 receives the communication request along with the identity of the user, which may be sensed via the UserTag. The application 110 performs the identifying 706, providing 708, routing 710, selecting 712, and combining 716 operations described above for FIG. 6 to set up and operate a communication service between the user and the other user via the network entity 150.

Further example systems and related operations will now be described to further illustrate how I/O user devices having different UI capabilities can be operationally combined to provide a combined UI that can be used by a user to satisfy the communication requirements of a communication service.

Further illustrative operations are described regarding an example embodiment in which a speaker device is one of the I/O user devices 130 in the set capable of playing a received audio stream and a microphone device is another one of the I/O user devices 130 in the set capable of sensing audio to output a microphone stream. Operations by the user terminal emulation server 100 (e.g., by one of the user terminal emulation applications) include updating the repository 120 based on content of registration messages from the speaker device and the microphone device to identify network addresses of the speaker device and the microphone device, and to identify UI capabilities of the speaker device as having a speaker capability and the microphone device as having a microphone capability. The speaker UI capabilities may identify a number of speakers operated, output sound loudness capability, and/or other operational characteristics. The microphone UI capabilities may identify a number of microphones provided, sensitivity of the microphones, and/or other operational characteristics. The speaker device and the microphone device are each identified as belonging to the set of I/O user devices that are determined to be proximately located to or are predicted to become proximately located to the location of the user (e.g., UserTag #1) and are further determined, based on the UI capabilities identified by the repository 120, to satisfy the combined capability criterion for being combinable to provide a combined I/O UI for the user to interface with the user terminal emulation application 110 to provide the communication service. Based on determining that the speaker device and the microphone device satisfy the combined capability criterion, further operations are performed to route a microphone stream received from the microphone device toward the requesting user terminal (e.g., via network entity 150). When an audio stream is received as communication traffic from the requesting user terminal the operations select the speaker device based on matching an audio characteristic of the audio stream to the speaker capability identified by the repository for the speaker device, and then route the audio stream toward the network address of the speaker device.

The example embodiment may include, when a display device is one of the I/O user devices in the set which is capable of displaying a received video stream, the operations to update 700 the repository 120 based on content of registration messages to identify network addresses of the display device, and to identify 706 UI capabilities of the display device as having a display capability. The display UI capabilities may identify a screen display size, aspect ratio, pixel resolution, video frame rates supported, whether display device supports shared user support via split screen configuration, and/or other operational characteristics. The display device is also identified as among the set of I/O user devices that is determined to be proximately located to or predicted to become proximately located to the location of the user and is further determined, based on the UI capabilities identified by the repository 120, to satisfy the combined capability criterion for being combinable to provide the combined I/O UI for the user to interface with the user terminal emulation application 110 to provide the communication service. Based on determining that the speaker device, the display device, and the microphone device satisfy the combined capability criterion, further operations are performed that respond to receipt of a video stream as communication traffic from the requesting user terminal by selecting the display device based on matching a video characteristic of the video stream to the display capability identified by the repository 120 for the display device, and then routing the video stream toward the network address of the display device.

In the example embodiment the operations for routing the audio stream and the video stream toward the network addresses of the speaker device and the display device, respectively, may include when audio data and video data are received within a same stream from the requesting user terminal through a first communication session: separating the audio data from the video data; routing the audio data toward the network address of the speaker device through a second communication session; and routing the video data toward the network address of the display device through the second communication session or a third communication session.

The example embodiment may include, when a camera device is one of the I/O user devices in the set capable of outputting a camera stream, the operations update the repository 120 based on content of a registration message to identify a network address of the camera device and to identify a UI capability of the camera device as having a camera capability. The camera UI capabilities may identify a camera pixel count, image quality, light sensitivity, and/or other operational characteristics. The camera device is further identified as a member of the set of I/O user devices that are determined to be proximately located to the location of the user or the user is predicted to become proximately located thereto, and is further determined based on the UI capability identified by the repository 120 to satisfy the combined capability criterion for being combinable with the other I/O user devices in the set to provide the combined I/O UI for the user to interface with the user terminal emulation application 110 to provide the communication service. Based on determining that the camera device satisfies the combined capability criterion, further operations are performed to route the camera stream received from the camera device toward the requesting user terminal, e.g., via the network entity 150.

The operations for routing the microphone stream received from the microphone device and the camera stream received from the camera device toward the requesting user terminal, can include: receiving the microphone stream from the microphone device through a first communication session; receiving the camera stream from the camera device through the first communication session or a second communication session; combining the microphone stream and camera stream in a combined stream; and routing the combined stream toward a requesting user terminal through a third communication session, e.g., via the network entity 150.

The example embodiment may include, when a keyboard device is one of the I/O user devices in the set capable of outputting key selection data responsive to key selections by a user among keys of the keyboard device, the operations can update the repository 120 based on content of a registration message to identify a network address of the keyboard device and to identify a UI capability of the keyboard device as having a keyboard capability. The keyboard device capabilities may identify a key count, indication of whether the keyboard is a physical keyboard or a touch sensitive input device, and/or other keyboard capabilities. The keyboard device is further identified as a member of the set of I/O user devices that are determined to be proximately located to the location of the user or are predicted to become proximately located to the user, and is further determined, based on the UI capability identified by the repository 120, to satisfy the combined capability criterion for being combinable with the other I/O user devices in the set to provide the combined I/O UI for the user to interface with the user terminal emulation application 110 to provide the communication service. Based on determining that the keyboard device satisfies the combined capability criterion, further operations are performed to identify commands formed by the key selection data received from the keyboard and to perform operations that have been predefined as being triggered based on receipt of the identified commands.

The operations for routing the key selection data received from the keyboard device and microphone stream received from the microphone device, may include: receiving the key selection data from the keyboard device through a first communication session receiving the microphone stream from the microphone device through the first communication session or a second communication session; combining the key selection data and the microphone stream in a combined stream; and routing the combined stream toward the requesting user terminal through a third communication session, e.g., via the network entity 150.

Figure 2:
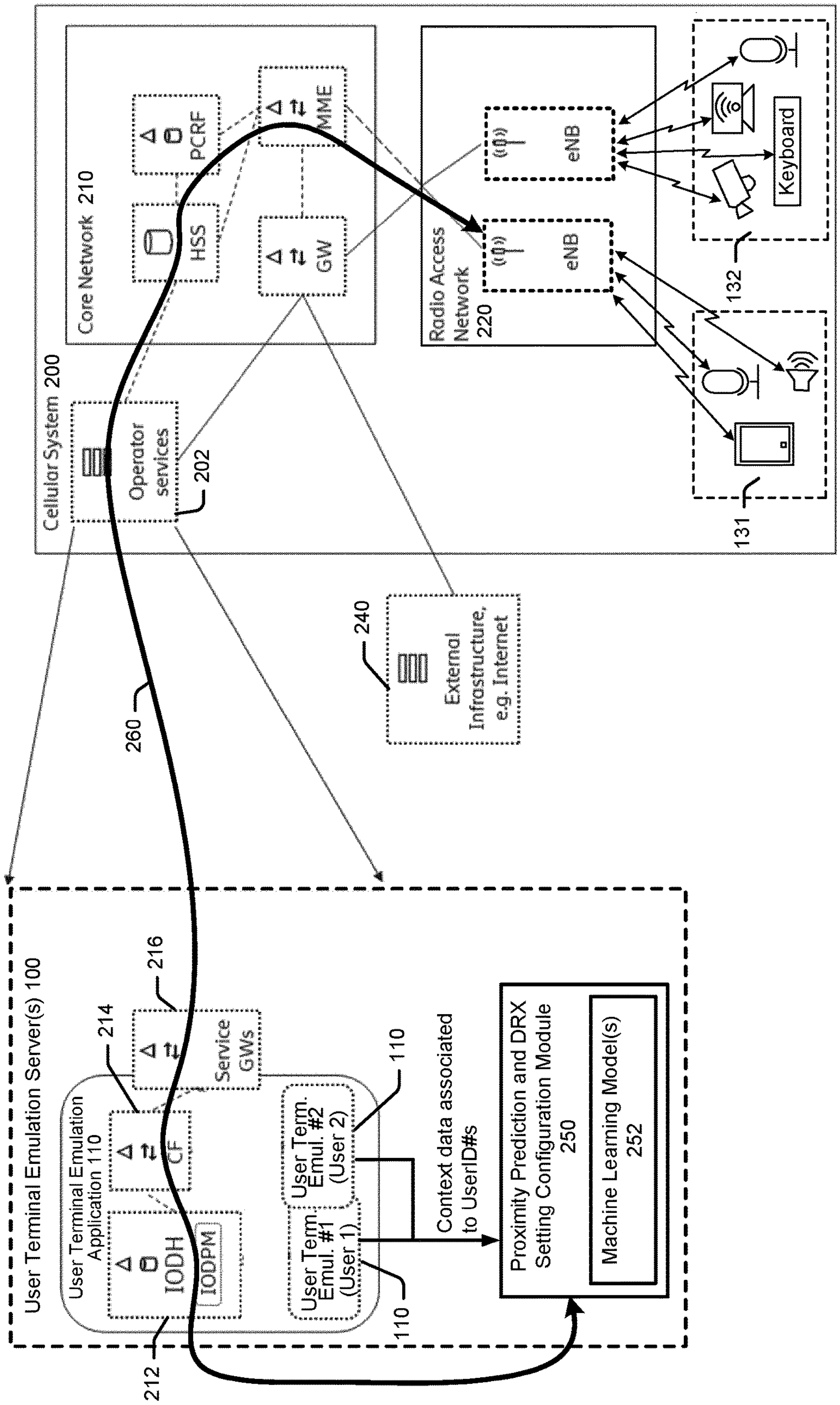
FIG. 2 is a block diagram illustrating the user terminal emulation server communicating with various elements of a cellular communications network to provide communication services in accordance with some embodiments of the present disclosure.

FIG. 2 is a block diagram illustrating the user terminal emulation server 100 as an element of an operator service node 202 within a cellular system 200. Referring to FIG. 2, the communication service function of the network entity 140 (FIG. 1) may be provided by the operator service node 202 or may be provided by remote server(s) through external infrastructure 240, e.g., the Internet and/or private network. The user terminal emulation server 100 may, for example, be implemented in the radio access network 220 to provide edge computing with faster responsiveness or may be implemented within another node of the cellular system 200. The user terminal emulation server 100 can include an I/O user device handler (IODH) 212, a control function (CF) 214, the instantiated user terminal emulation applications 110, and a service gateway (GW) 216. A user terminal emulation application 110 may run one or more applications that are normally run by a smartphone, such as a Netflix application, Facebook application, Skype application, Internet browser application, etc.

The IODH 212 may perform operations to manage the I/O user devices, such as to handle maintenance (700 in FIG. 7) of the repository 120 and/or perform registration (702 in FIG. 7) of the users and possibly also user terminal emulation applications 110. For example, the IODH 212 may operate to register with a Skype service server the IP address of a Skype application, which is run by or interfaced to the user terminal emulation application 110, and the user's Skype name. The CF 214 may be responsible for assigning an IP address to each user terminal emulation application 110. The IP address to be assigned by the CF 214 may be received from the core network 210 functionality such as a PDN-GW. The service GW 216 may interconnect the user terminal emulation server 100 to a PSTN network, packet data network gateway of a 3GPP (3rd Generation Partnership Project) system, etc. The cellular system 200 can include a Core Network 210 having a Home Subscriber Server (HSS), a Policy and Charging Roles Function (PCRF), gateway (GW) and Mobility Management Entity (MME) providing control signaling related to mobile terminal mobility and security for the radio access. The HSS contains subscriber-related information and provides support functionality for user authentication and user access to the system. The PCRF enables QoS control per data flow and radio bearer, by setting QoS criteria for each data flow, based on operator set policies and subscriber information. The GW can include a Serving GW (S-GW) and a Packet Data Network GW (PDN-GW), where the S-GW interconnects the core network 210 with the radio access network 220 and routes incoming and outgoing packets. The PDN-GW interconnects the core network 210 with external infrastructure 240, such as the Internet, and allocates IP-addresses and performs policy control and charging.

Some I/O user devices having cellular communication capability can communicate via, e.g., eNBs or other radio access nodes of a Radio Access Network 220 with the operator service node 202 via the core network 210. In the system of FIG. 2, the user terminal emulation server 100 may handle set up of a communication service between a selected set of the I/O user devices, which are determined to be proximate to a user or predicted to become proximately located to the user, and a remote user terminal via the cellular system 200.

In the example of FIG. 2, the user terminal emulation server 100 includes a proximity prediction and DRX setting configuration module 250 performing operations to predict (operation 1102 in FIG. 11) the likelihood that a user will become proximately located to an I/O user device, determine (operation 1104 in FIG. 11) DRX settings based on the predicted likelihood the user will become proximately located to the I/O user device, and configure (operation 1106 in FIG. 11) the I/O user device to use the DRX settings for receiving downlink radio communications from the RAN 220. The module 250 may include machine learning module 252 in operations to predict the likelihood that a user will become proximately located to various I/O user devices, such as will be described in further detail below. The DRX settings can be communicated to the RAN 220 to configure one or more of the I/O user devices.

In the example described above with reference to FIGS. 1 and 2, the proximity prediction and DRX setting configuration module 250 has predicted that the user is presently proximately located to the I/O user devices in area 131 and has determined the first set of DRX settings, which have been communicated through pathway 260 to the RAN 220 for an eNB to use for configuring DRX operation of the I/O user devices in area 131. The proximity prediction and DRX setting configuration module 250 has also predicted that the user has a 75% likelihood of becoming proximately located to another set of I/O user devices 130 in area 132, e.g., within a threshold time, and has determined the second set of DRX settings which have been communicated through pathway 260 to the RAN 220 for another eNB to use for configuring DRX operation of the I/O user devices in area 132.

The above and other operations will now be described in further detail in the context of two different example "use cases": 1) incoming call scenario; and 2) outgoing call scenario.

Use Case 1: Incoming Call Scenario

This use case involves a user, with a UserTag or other way of being identified, being proximately located to or predicted to become proximately located to I/O user devices 130 having various UI capabilities in area 131 when an incoming call is received by the user terminal emulation server 100. Although operations are explained below in the context of identifying a user through a physical UserTag carried by the user, these operations are not limited thereto and may be used with any other way of identifying a user, such as by sensing biometric information that identifies the user.

A user terminal emulation application 110 may be instantiated or otherwise activated responsive by an incoming call (service, session) targeting the UserTag. The user terminal emulation application 110 can identify subscriptions associated with the UserTag (i.e. the physical user) and preferred methods of communication (e.g., audio not video, audio and video, etc.) that have been specified by the user, and determines the UI capabilities of the I/O user devices that will be needed to satisfy the UI capabilities which may be specified for the incoming communication session. The user terminal emulation application 110 may ask the IODH to identify which I/O user devices 130 are proximately located to the UserTag or are predicted to become proximately located to the UserTag, and may further ask the IODH to determine or may determine itself whether the identified I/O user devices 130 are combinable to satisfy the UI capabilities specified by the incoming communication session. The user terminal emulation application 110 and/or the IODH may receive an ACK or NACK back on whether a sufficient set of I/O user devices 130 can be used to provide the communication service. If ACK, then the IODH may also sets the state of the I/O user devices 130 in the set to in-use to avoid another user terminal emulation application 110 attempting to utilize the same I/O user devices 130 as which are presently in use or about to become in use. In case of NACK, the user terminal emulation application 110 and/or the IODH can take different actions to setup a reduced UI capability communication service with the user depending on user settings, e.g. only allow sound-based communications instead of a combination of sound and video responsive to when no display device is presently available for use. An example of no display device being available may occur when the only display device that is proximately located to the user is presently being used by another user to receive information from another user terminal emulation application during an ongoing communication service or when no display device is proximately located to the user.

Figure 3:
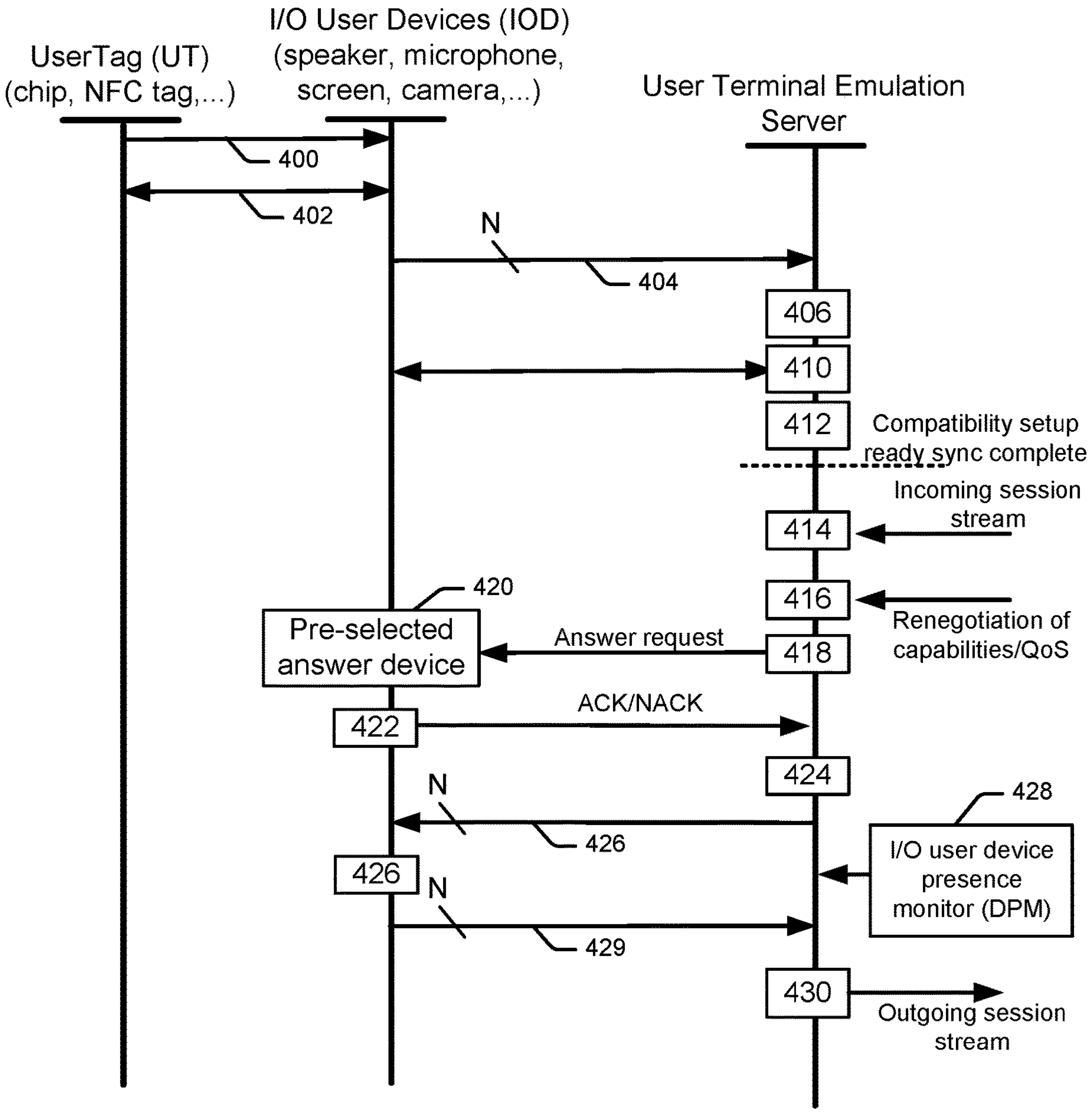
FIGS. 3-5 are combined flowcharts of operations and related data flows between UserTags, I/O user devices, and the user terminal emulation server in accordance with some embodiments of the present disclosure.

FIG. 3 is a combined flowchart of operations and related data flows between UserTags, I/O user devices, and the user terminal emulation server in accordance with some embodiments of the present disclosure. Referring to FIG. 3, a UserTag enters a room and signals 400 its presence to any proximately located and capable I/O user device in the room using a discovery beacon signal. Alternatively, one or more of the I/O user devices determines presence of the UserTag by polling 402, such as by periodically transmitting discover beacon signals that trigger responsive signaling by the UserTag. The I/O user devices that receive signaling indicated presence of the UserTag report 404 to the IODH in the user terminal emulation server along with a network address of the I/O user device (e.g., IP address, port number, MAC address, FQDN, etc.). The user terminal emulation application corresponding to the specific user (i.e., the UserTag) is updated 406 with respect to the detected user's presence. The IODH may operate to receive the notifications from the I/O user devices proximately located to the UserTag. Further UI capability discovery (synchronization) communications 410 are performed between the user terminal emulation server and the I/O user devices which reported the user's presence and/or with I/O user devices that predicted to become proximately located to the user such as based on the user presently being proximately located to another one of the I/O user devices. The I/O user devices are associated to the user in the repository, along with associated indications subscriptions, combinable UI capabilities provided by the set of I/O user devices which are proximately located to or predicted to become proximately located to the UserTag. By operation 412 the user via the UserTag is now known to be reachable within the system through an identified set of I/O user devices with identified UI capabilities (e.g., speakers yes/no, display yes/no, microphone yes/no, keyboard yes/no, etc.), thereby creating a logical virtualized user terminal through which the user may be provided in a communication service. The user may initiate a communication service through a touchscreen, voice command sensed by a microphone, performing a defined gesture observable by a camera, and/or other input provided to one of the proximately located I/O user devices.

In operation 414, an incoming session (e.g., video call) from a requesting user terminal which is directed to the user (UserTag) arrives at the user terminal emulation server for the user carrying the UserTag. In operation 416 the combinable UI capabilities of the available I/O user devices is compared to the UI requirements of the incoming session. When the UI requirements of the incoming session are not satisfied by the combinable UI capabilities of the I/O user devices, the user terminal emulation server may renegotiate 416 the required UI capabilities (e.g., audio only, audio and video, video only, etc.) of the incoming session. In contrast, when the UI requirements of the incoming session are satisfied by the combinable UI capabilities of the I/O user devices the user terminal emulation server prompts, via one or more of the available I/O user devices (e.g., a pre-selected answer device), the user carrying the UserTag to provide a session request answer (ACK/NACK). The user responds through the pre-selected answer device 420 to accept (ACK) or reject (NACK) the incoming session, to provide signaling 422 to the user terminal emulation server. When an ACK is received, operations 424 route an audio stream from the requesting user terminal to one of the I/O user devices in the set that has a speaker capability via one or more sessions 426, and route a video stream from the requesting user terminal to another one of the I/O user devices in the set that has a display capability via one or more sessions 426. A data stream that is received from one of I/O user devices in the set through a one or more sessions 429 is routed 430 toward the requesting user terminal. When two or more data streams are received through one or more sessions 429 from the I/O user devices, they can be combined into a combined data stream that is routed 430 toward the requesting user terminal.

The user terminal emulation server may perform operations 428 to continuously monitor presence of the I/O user devices in area 131 to determine when one or more of I/O user devices are no longer proximately located to the user such that they can no longer be included as part of the combined UI be provided during the ongoing communication session. The user terminal emulation server may substitute the UI capability of another I/O user device to the set being used by the user for the ongoing communication session responsive to a previous member of the set no longer being proximately located. The user terminal emulation server may substitute the UI capability of another I/O user device that is predicted to become proximately located to the user as the user moves to area 132, and may determine updated DRX settings and configured the other I/O user device in area 132 according to the updated DRX settings to prepare the other I/O user device to more immediately receive and use downlink communications from the service eNB of the RAN 220 relating to the ongoing communication session. The user terminal emulation server 100 can dynamically generate updated predictions of the likelihood that the user will become proximately located or remain proximately located to the various I/O user devices, and dynamically update the DRX settings used for the various I/O user devices based on the updated predictions.

Use Case 2, Outgoing Call

This use case involves a user, with a UserTag, being proximately located to or predicted to become proximately located to I/O user devices 130 in area 131 having different UI capabilities when an outgoing call (communication session) is received by the user terminal emulation server 100.

The I/O user devices 130 are associated to the identified user via the user terminal emulation server 100 which handles all communications sessions for the user while the associated I/O user devices 130 are managed by an IODH.

A user terminal emulation application 110 may be instantiated or otherwise activated responsive by an outgoing call being requested by a user carrying the UserTag. The user may initiate an outgoing call through a touchscreen, voice command sensed by a microphone, performing a defined gesture observable by a camera, and/or other input provided to a proximately located I/O user device.

The user terminal emulation application 110 can identify subscriptions associated with the UserTag (i.e. the physical user) and preferred methods of communication (e.g., audio not video, audio and video, etc.) that have been specified by the user, and determines the UI capabilities of the I/O user devices that will be needed to satisfy the UI capabilities which may be specified for the outgoing call. The user terminal emulation application 110 may ask the IODH to identify which I/O user devices 130 are proximately located to the UserTag in area 131 and further ask, e.g., depending upon the answer, which other I/O user devices 130 are predicted to become proximately located to the user, such as in area 132. The user terminal emulation application 110 may further ask the IODH to determine or may determine itself whether the identified I/O user devices 130 and/or other I/O user devices 130 are combinable to satisfy the UI capabilities specified by the outgoing call. The user terminal emulation application 110 and/or the IODH may receive an ACK or NACK based on whether a sufficient set of I/O user devices 130 can be used to provide the communication service. If ACK, then the IODH also sets the state of the I/O user devices 130 in the set to in-use to avoid another user terminal emulation application 110 attempting to utilize the same I/O user devices 130 as which are presently in use or about to be in use. In case of NACK, the user terminal emulation application 110 and/or the IODH can take different actions to setup a reduced UI capability communication service with the user depending on user settings, e.g. only allow sound instead of the preferred sound and video responsive to when no display device is presently available for use (e.g., when presently used by another user terminal emulation application 110 or when none is proximately located to the UserTag or predicted to become proximately located to the UserTag with a threshold time).

Figure 4:
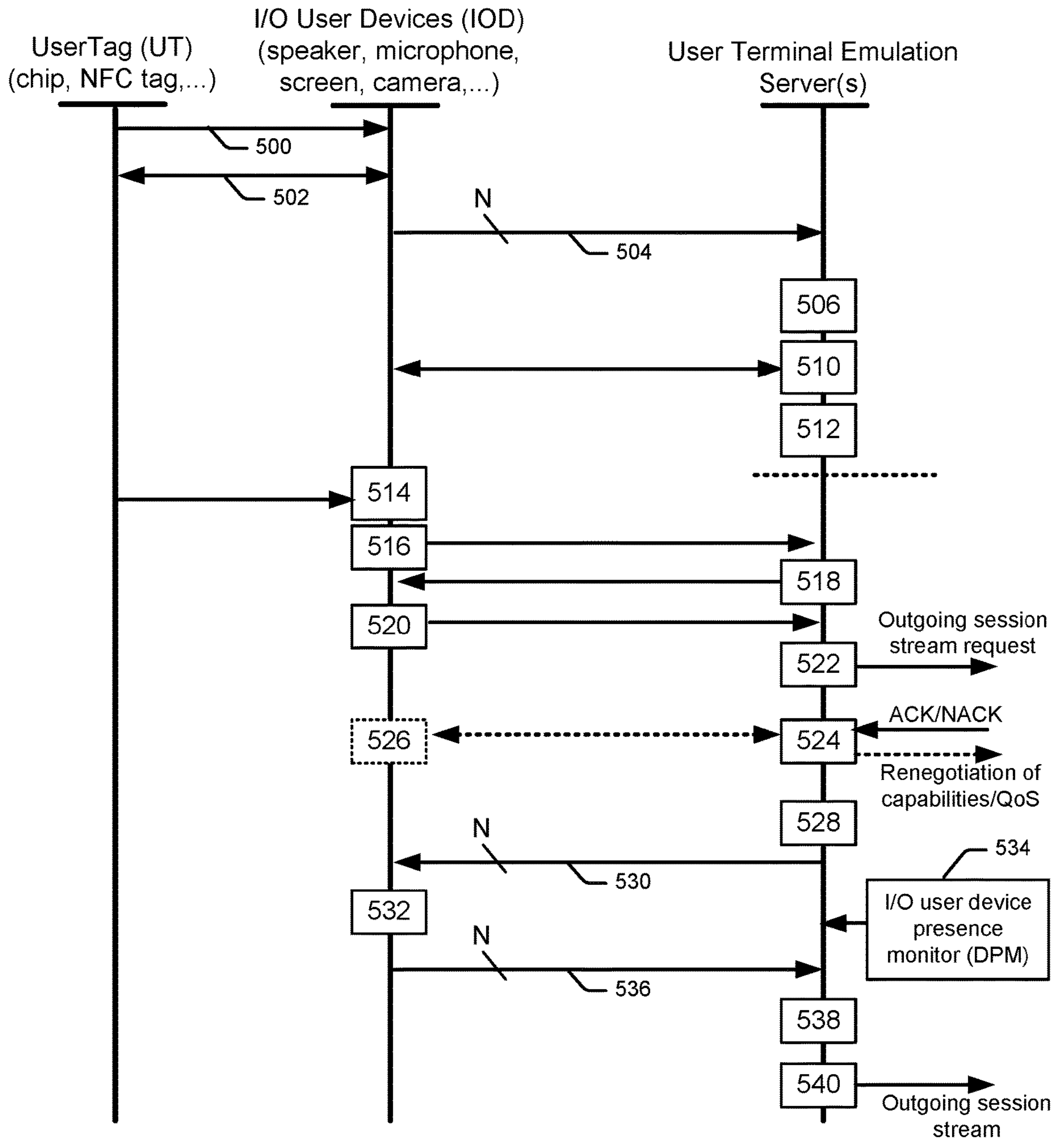
Figure 5:
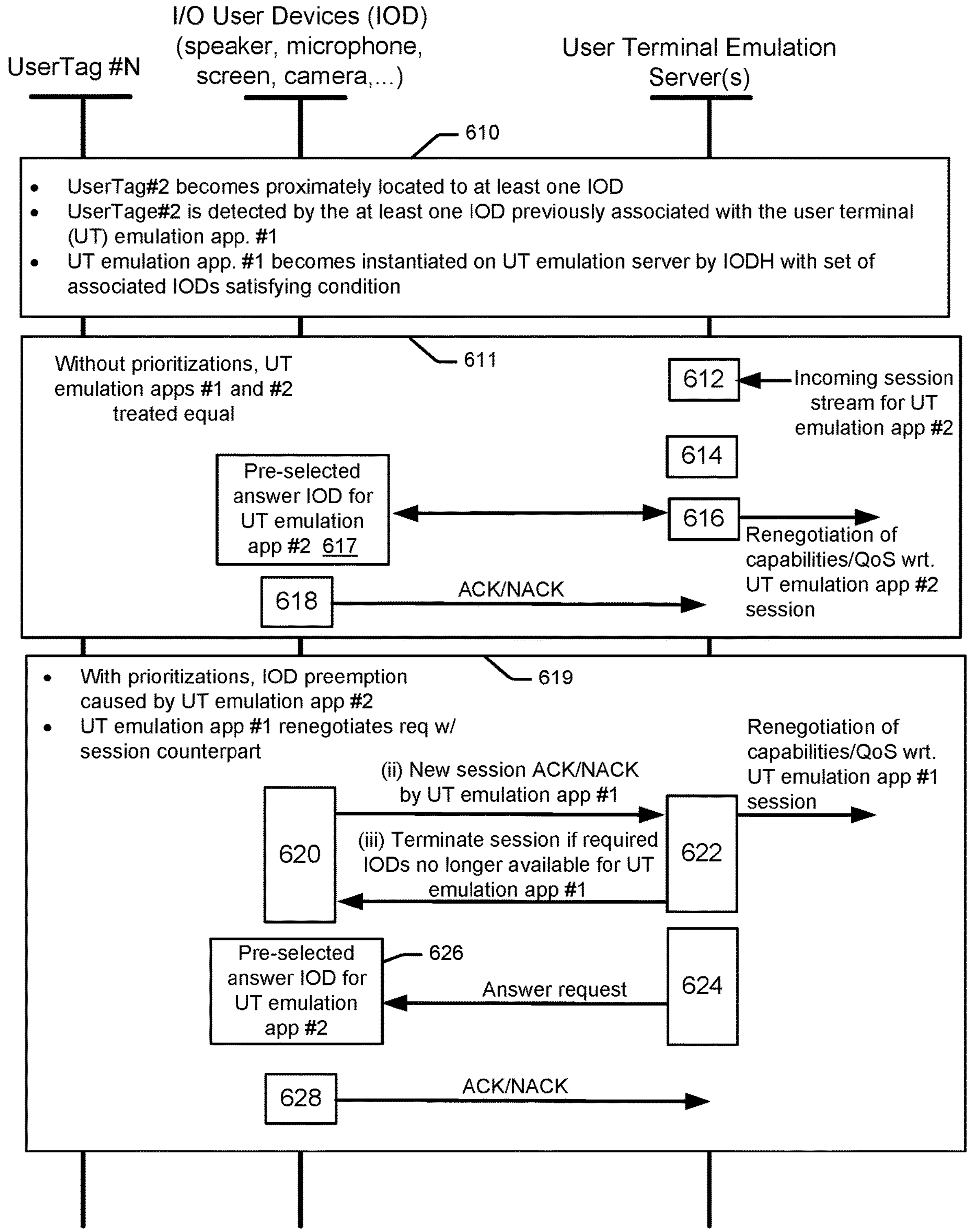

FIG. 4 is a combined flowchart of operations for an outgoing call and related data flows between UserTags, I/O user devices, and the user terminal emulation server in accordance with some embodiments of the present disclosure. Referring to FIG. 4, a UserTag enters a room and signals 500 its presence to any proximately located and capable I/O user device in the room using a discovery beacon signal. Alternatively, one or more of the I/O user devices determines presence of the UserTag by polling 502, such as by periodically transmitting discover beacon signals that trigger responsive signaling by the UserTag. The I/O user devices that receive signaling indicated presence of the UserTag report 504 to the IODH in the user terminal emulation server along with a network address of the I/O user device (e.g., IP address, port number, MAC address, FQDN, etc.). The user terminal emulation application corresponding to the specific user (i.e., the UserTag) is updated 506 with respect to the detected user's presence.

The IODH may operate to receive the notifications from the I/O user devices proximately located to the UserTag. Further UI capability discovery (synchronization) communications 510 are performed between the user terminal emulation server and the I/O user devices. The I/O user devices are associated to the user in the repository 120, along with associated indications subscriptions, combinable UI capabilities provided by the set of I/O user devices which are proximately located to the UserTag. By operation 512 the user via the UserTag is now known to be reachable within the system through an identified set of I/O user devices with identified UI capabilities (e.g., speakers yes/no, display yes/no, microphone yes/no, keyboard yes/no, etc.) in area 131, thereby creating a logical virtualized user terminal through which the user may be provided a communication service. The IODH may further predict what other I/O user devices will become proximately located to the user in area 132, such as within a threshold time and have combinable UI capabilities that satisfy the capability requirements. The user may initiate a communication service through a touchscreen, voice command sensed by a microphone, performing a defined gesture observable by a camera, and/or other input provided to one of the proximately located I/O user devices.

In operation 514, a user carrying the UserTag uses the UI of one of the I/O user devices to trigger 514 an outgoing call (e.g., video call), which triggers signaling 516 of the outgoing call to the user terminal emulation server. In operation 518 the IODH queries the user (e.g., displays a message, generates a sound, etc.) through one of the I/O user devices proximately located to the user to request the user to select among available types of communication methods that can be presently used for the outgoing call. One of the I/O user devices provides responsive signaling 520 to the IODH indicating the user's selected type of communication method for the outgoing call. In operation 522 the user terminal emulation server communicates an outgoing session stream request to the network entity 150, where the request may include an identifier of the calling user, identifier of the user terminal of the called user, and a quality of service for the communication session. In operation 522, the user terminal emulation server receives a communication session acceptance (ACK) or denial (NACK) from the network entity 150. When the communication session is denied, the user terminal emulation server may attempt to renegotiate 524 the requested communication session such as at a lower quality of service.

When the communication session is accepted (ACK), for each data type that is received 528 as communication traffic from the requesting user terminal, the user terminal emulation server selects one of the I/O user devices from among the set of I/O user devices based on matching characteristics of the data type to the UI capabilities identified by the repository for the one of the I/O user devices, and then routes 530 the data of the data type toward the network address of the selected one of the I/O user devices. The data originating ones of the I/O user devices transmit 532 data stream through one or more sessions 536 to the user terminal emulation server 100, which may combine 538 the data streams into a combined data stream that is routed 540 toward the called user terminals via the network entity 150.

The user terminal emulation server 100 may continuously monitor 534 presence of the I/O user devices to determine when one or more of I/O user devices is no longer proximately located to the user such that it can no longer be included as part of the combined UI to be provided during the ongoing communication session and/or to determine when one or more of predicted soon-to-be proximately located I/O user devices, e.g., in area 132, become proximately located to the user such that they can be included as part of the combined UI to be provided during the ongoing communication session. The user terminal emulation server may substitute the UI capability of another I/O user device, e.g., an I/O user device in area 132 that is predicted to become proximately located to the user, to the set being used by the user for the ongoing communication session responsive to a previous member of the set no longer being proximately located. The user terminal emulation server 100 can dynamically generate updated predictions of the likelihood that the user will become proximately located or remain proximately located to the various I/O user devices, and dynamically update the DRX settings used for the various I/O user devices based on the updated predictions.

Figure 10:
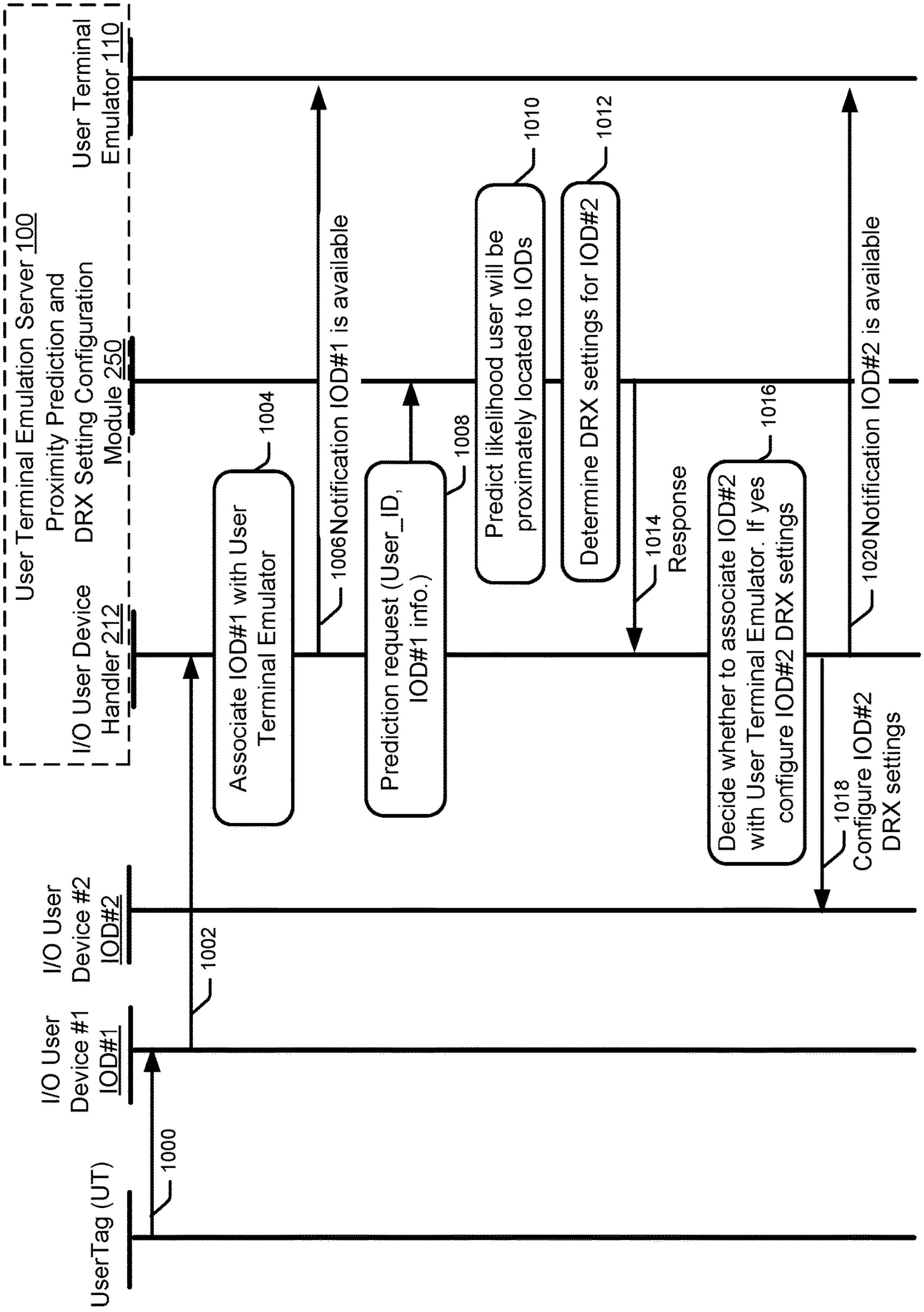
FIG. 10 is a combined flowchart of operations and related data flows between UserTags, I/O user devices, and the user terminal emulation server in accordance with some further embodiments of the present disclosure.

Predict User Proximity and Configure DRX Settings of I/O User Devices for Communication Service FIG. 10 illustrates a combined flowchart of operations and related data flows between UserTags, I/O user devices 130, and the user terminal emulation server 100 to predict that a user will become proximately located to an I/O user device and to responsively configure DRX settings of the I/O user devices for receiving downlink communications from a RAN which are related to a communication service for the user, in accordance with some embodiments of the present disclosure.

Referring to FIG. 10, a first I/O user device (IOD #1) detects 1000 a UserTag transported by the user, and sends 1002 to the user terminal emulation server 100 IOD data that is obtained from the UserTag or determined based on sensing characteristics of the UserTag. The IOD data may include a user identifier, user preferences relating to one or more types of communication services, and/or user mobility information (e.g., location, speed of movement, direction of movement, etc.). The user preferences indicated by the IOD data may include one or more of: whether the user prefers to use headset audio or loudspeaker audio, the user's speaker loudness preference, whether the user prefers to participate in online meetings using or without using camera video, the user's written language preference, the user's keyboard layout configuration preference, the user's video characteristic preference (e.g., minimum text size preference), etc.

In the example of FIG. 10, the IOD data is received by an I/O user device handler (IODH) 212 which associates 1004 the first I/O user device (IOD #1) with a user terminal emulation application 110, and sends 1006 a notification to the user terminal emulation application 110 indicating that the first I/O user device (IOD #1) is presently proximately located to the user and available to provide a communication service for the user. The IODH 212 sends 1008 a prediction request containing at least part of the IOD data, such as the user identifier and an indication that the first I/O user device (IOD #1) is presently proximately located to the user.

In some embodiments, the prediction request is provided to a proximity prediction and DRX setting configuration module 252, which may use the machine learning model 252, to predict 1010 (also 1102 in FIG. 11) likelihood that the user will become proximately located to which, if any, other I/O user device(s) based on content of the received prediction request. In one embodiment, the machine learning model 252 determines one or more I/O user devices that satisfy a criterion for having a likelihood probability which satisfies a threshold for becoming within a threshold proximity range of the user within a threshold time. For any of the I/O user devices which satisfy the criterion, the module determines (1104 in FIG. 11) DRX settings based on the predicted likelihood the user will become proximately located to the I/O user device, and configures (1106 in FIG. 11) the I/O user device to use the DRX settings for receiving downlink radio communications from a RAN 220 which are related to the communication service.

In one embodiment, the prediction (1010 in FIGS. 10 and 1102 in FIG. 11) of likelihood the user will become proximately located to the I/O user device, comprises estimating time until the user will become proximately located to the I/O user device. The DRX settings are determined (1104 in FIG. 11) based on the estimated time.

In another illustrative embodiment, the module 250 predicts (1010 in FIGS. 10 and 1102 in FIG. 11) the likelihood that the user will become proximately located to a first I/O user device based on estimating the user will become proximately located to the first I/O user device in a first elapsed time. The module 250 similarly predicts (1010 in FIGS. 10 and 1102 in FIG. 11) the likelihood that the user will become proximately located to a second I/O user device based on estimating the user will become proximately located to the second I/O user device in a second elapsed time which is greater than the first elapsed time. The module 250 similarly predicts (1102 in FIG. 11) the likelihood that the user will become proximately located to a third I/O user device based on estimating the user will become proximately located to the third I/O user device in a third elapsed time which is greater than the second elapsed time. The module 250 determines (1104 in FIG. 11) first DRX settings for configuring the first I/O user device based on the first elapsed time, second DRX settings for configuring the second I/O user device based on the second elapsed time, and third DRX settings for configuring the third I/O user device based on the third elapsed time. The second DRX settings configure the second I/O user device to operate with a greater ratio of lower power consumption mode time relative to higher power consumption mode time compared to the first I/O user device configured by the first DRX settings. The third DRX settings configure the third I/O user device to operate with a greater ratio of lower power consumption mode time relative to higher power consumption mode time compared to the second I/O user device configured by the second DRX settings. During the lower power consumption mode the first, second, and third I/O user devices cannot receive downlink radio communications from the RAN. In contrast, during the higher power consumption mode the first, second, and third I/O user devices can receive downlink radio communications from the RAN.

In another related embodiment, the module's 250 prediction (1010 in FIGS. 10 and 1102 in FIG. 11) of likelihood the user will become proximately located to the I/O user device, comprises generating a set of proximity probability values indicating likelihood that the user will become proximately located to the I/O user device as a function of a set of different elapsed times. The DRX settings are then determined (1104 in FIG. 11) based on the set of proximity probability values.

The determination of DRX settings for the I/O user devices in the set, may comprise determining a set of DRX settings for individual ones of the I/O user devices in the set based on an operational characteristic of the individual one of the I/O user devices in the set. The operations can then configure the I/O user devices in the set to use the DRX settings for receiving the downlink radio communications from the RAN related to the communication service, through operations that include, for individual ones of the I/O user devices in the set, communicating one of the sets of DRX settings to the individual one of the I/O user devices in the set which was determined based on the characteristic of the individual one of the I/O user devices in the set.

When determining DRX settings for the I/O user devices in the set, the operations may identify a power-limited one of the I/O user devices in the set that is most limited by remaining operational time duration obtainable from a battery power supply, relative to other ones of the I/O user devices in the set. The operations then determine the DRX settings for the I/O user devices in the set based on an operational characteristic of the power-limited one of the I/O user devices.

In another embodiment, the operations for determining (1012 in FIGS. 10 and 1104 in FIG. 11) the DRX settings based on the predicted likelihood the user will become proximately located to the I/O user device, includes determining the DRX settings for the I/O user device based on information received from the I/O user device indicating at least one of the following operational characteristics of the I/O user device: downlink streaming audio playout capability; downlink streaming video display capability; uplink streaming microphone audio capability; and uplink streaming camera video capability.

In another embodiment, the operations for determining (1012 in FIGS. 10 and 1104 in FIG. 11) the DRX settings for one or more I/O user devices include sending to the RAN 220 a query message requesting identification of current DRX settings configured for the I/O user device(s) that can be changed, and then then determining the DRX settings based on content of a response message from the RAN to the query message and based on the predicted likelihood the user will become proximately located to the I/O user device (s).

The module 252 provides 1014 a prediction response to the IODH 212, which in the example of FIG. 10 indicates that a second I/O user device (IOD #2) satisfies the criteria. The prediction response can identify a list of any I/O user devices which satisfy the determinations by the machine learning model 252 and identify the determined DRX settings.

In the example of FIG. 10, the IODH 212 decides 1016 whether to associate the second I/O user device (IOD #2) with the user terminal emulation application 110 based on the prediction response and a determination whether the second I/O user device (IOD #2) has an I/O user interface that satisfies a capability criterion to enable the user to use a communication service through the network entity 150. When the IODH 212 decides 1016 to associate the second I/O user device (IOD #2) with the user terminal emulation application 110, the IODH 212 can communicate the DRX settings and identity of the second I/O user device (IOD #2) to the RAN 220, e.g., the serving eNB, or to an intermediary network node which translates the DRX settings into translated DRX settings provided to the RAN, for configuring DRX operation of the second I/O user device (IOD #2) according to the determined DRX settings in order to more rapidly receive and use downlink communications from the RAN 220 relating to the communication service.

When communicating the DRX settings and identity of the second I/O user device (IOD #2) to the RAN or to an intermediary network node which translates the DRX settings into translated DRX settings provided to the RAN, for configuring DRX operation of the second I/O user device (IOD #2), the operations may communicate a pointer to the RAN or to the intermediary network node that references a set of DRX settings among a repository of DRX settings which are preconfigured in the RAN or preconfigured in the intermediary network node, to be used to configured DRX operation of the second I/O user device (IOD #2) that is identified.

The configuration (1018 in FIGS. 10 and 1106 in FIG. 11) of the I/O user device (e.g., second I/O user device (IOD #2)) to use the DRX settings for receiving downlink radio communications from the RAN related to the communication service, may include communicating the DRX settings to the second I/O user device (IOD #2) using radio resource control (RRC) signaling through the RAN.

The IODH 212 may further send 1020 a notification to the user terminal emulation application 110 indicating that the second I/O user device (IOD #2) is available or may soon become available to provide a communication service for the user. In this manner, the user terminal emulation application 110 is made aware that the second I/O user device (IOD #2) can be used to set up a communication service with the user or to hand off an ongoing communication service involving the user, such as from using the first I/O user device (IOD #1) to instead using the second I/O user device (IOD #2). For example, an audio and/or video stream that was being routed to the first I/O user device (IOD #1) may then be additionally or alternatively routed to the second I/O user device (IOD #2), such as responsive to the first I/O user device (IOD #1) ceasing to detect the presence of the UserTag, e.g., for at least a threshold time and/or responsive to the second I/O user device (IOD #2) detecting new presence of the UserTag.

Using Machine Learning Model to Predict Proximity of User to I/O User Device

Various ways that the machine learning model 252 can be trained and used to predict (1010 in FIGS. 10 and 1102 in FIG. 11) proximity of a user to one or more I/O user devices are now explained.

In some embodiments, the machine learning model 252 includes a decentralized federated learning architecture with hierarchical associations between layers of machine learning models. A layer of local machine learning models process and are trained to track information indicating users' habits for using communication services (e.g., which I/O user devices the users usually use as a function of various types of communication services, as a function of time of day and/or day of week, as a function of how many people and/or which particular people are participating in the communication service). As the local machine learning models are updated based on observed user activity, model parameters are also transmitted to a higher level machine learning model which may reside in the IODH 212 which has been trained with knowledge about the relative locations of the I/O user devices and the associated local machine learning models that more locally monitor I/O user device usage. Each of the models may be configured as a Deep Neural Network (DNN) or Convolutional Neural Network (CNN).

The division of responsibility between the hierarchical layers of models can be configured according to geographic area constraints, e.g., so that "sub IODHs" have access to process information relating to only a city constrained list of locations of I/O user devices, and are trained based on user usage of the I/O user devices within that city. That city-based model can be then in-turn be connected to a higher level "municipality model" which encompasses the plurality of cities or directly to a "country model" which encompasses a plurality of municipalities, and so on. The architectural layout of the hierarchical machine learning models may be manually setup by one or more model owners and/or can be dynamically self-configured depending on the number of users, number of I/O user devices, observed patterns of mobility between the I/O user devices, etc. City, municipality, etc. are non-limiting examples and any grouping of I/O user devices to machine learning models can be used. The grouping may be based on data rates (number of I/O user devices communicating with the IODH 212, etc.), number of users, and/or local/regional regulatory borders.

Associations between I/O user devices and individual ones of the machine learning models may be remapped over time to reflect changes in location of the I/O user devices, such as when some of I/O user devices are not geographically fixed but instead mobile.

A repository database 120 (e.g., FIG. 1) containing locations and UI capabilities of I/O user devices may be organized in a data structure similar to a look-up-table that is continuously updated with new locations of I/O user devices. Alternatively, an improved approach may use a network model database or hierarchical model that is built up by the IODH 212 when new I/O user devices are being added. This makes the repository database 120 better at handling multiple access at the same time, since the lookup will start the traverse from the datapoints around it (geography-wise) and then search from there, until the search criterion has been met.

The machine learning model 252 can be trained based on time ordered sequences of I/O user devices which have been historically observed to sequentially become proximate to users, such as a first I/O user device near doorway detects proximity with users, then a second I/O user device further down a hallway detects proximity with some or all of those users, then a third I/O user device further down the hallway detects proximity with some or all of those users, then a fourth I/O user device in a main conference room further down the hallway detects proximity with some or all of those users, etc. In one embodiment, the operation predicting (1008, 1102) likelihood the I/O user device will become proximately located to the user, includes processing information indicating present proximity of the user to another I/O user device through the machine learning model 252 that has been trained based on time ordered sequences of I/O user devices that have been historically observed to become proximately located to users, and predicting likelihood the I/O user device will become proximately located to the user based on output of the machine learning model 252 from processing the information.

The DRX settings which are determined (1012 in FIGS. 10 and 1104 in FIG. 11) for an I/O user device, can be adjusted based on output of the machine learning model 252 indicating the predicted likelihood the user will become proximately located to the I/O user device. The operations may process information indicating present proximity of the user to another I/O user device through the machine learning model 252 that has been trained based on time ordered sequences of I/O user devices identified in the repository that have been historically observed to become proximately located to users, to output an indicated probability that the user is likely to become proximately located to the I/O user device. The operations then adjust the DRX settings which are configured for the I/O user device based on the indicated probability output by the machine learning model 252.

The machine learning model 252 may be trained based on historical observations of which users have been proximately located to which I/O user devices as a function of time and date. In one embodiment, the operations to predict likelihood that an I/O user device will become proximately located to the user, can include processing a time of day and date (where "date" can be the day of week, day of month, or day of year) through the machine learning model 252 that has been trained based on historically observed proximity between identified users and identified I/O user devices at identified times and dates, to output probability predictions of which of the identified users are predicted to become proximately located to identified I/O user devices. The operations then predict (1012, 1016, 1104, 1108) whether the I/O user device will become proximately located to the user based on an identity of the user and the probability predictions output by the machine learning model 252.

The machine learning model 252 may be trained based on locations of the I/O user devices, so a user's present location can generate a prediction of which, if any, I/O user devices are likely to become proximately located to the user. In one embodiment, the operations to predict (1010 in FIGS. 10 and 1102 in FIG. 11) likelihood that a I/O user device will become proximately located to the user, include processing a present location of the user through the machine learning model 252 that has been trained based on locations of the I/O user devices. The operations then predict likelihood the user will become proximately located to the I/O user device based on an output of the machine learning model 252 from processing the present location of the user.

Figure 12:
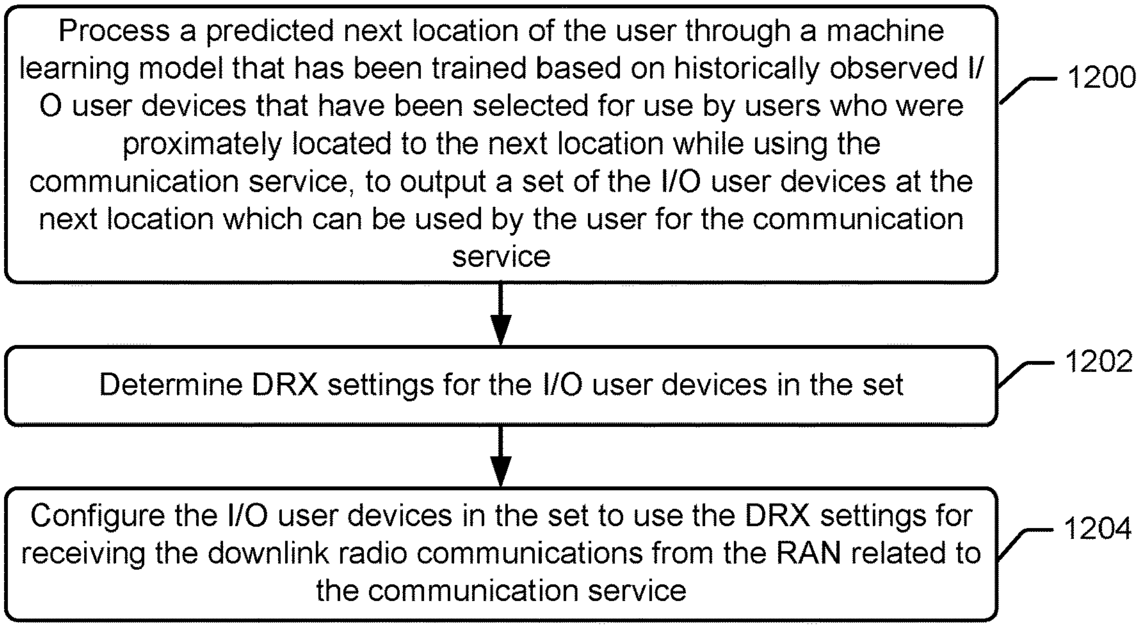

The machine learning model 252 may be trained based on historically observed I/O user devices that have been selected for use by users who were proximately located to the next location while using the communication service. FIG. 12 is a flowchart of corresponding operations that can be performed by the proximity prediction and DRX setting configuration module 250 according to one embodiment.

Referring to FIG. 12, the operations process 1200 a predicted next location of the user through the machine learning model 252 that has been trained based on historically observed I/O user devices that have been selected for use by users who were proximately located to the next location while using the communication service, to output a set of the I/O user devices at the next location which can be used by the user for the communication service. The operations determine 1202 (also 1012 in FIGS. 10 and 1104 in FIG. 11) DRX settings for the I/O user devices in the set. The operations then configure 1204 the I/O user devices in the set to use the DRX settings for receiving the downlink radio communications from the RAN related to the communication service.

The DRX settings for the I/O user devices in the set may be determined for each of the I/O user device based on their respective operational characteristics. For example, I/O user devices having different operational characteristics can have correspondingly different determine sets of DRX settings. The operations to determine 1202 the DRX settings for the I/O user devices in the set, can include determining a set of DRX settings for individual ones of the I/O user devices in the set based on an operational characteristic of the individual one of the I/O user devices in the set. The operations to configure 1204 the I/O user devices in the set to use the DRX settings for receiving the downlink radio communications from the RAN related to the communication service can include, for individual ones of the I/O user devices in the set, communicating one of the sets of DRX settings to the individual one of the I/O user devices in the set which was determined based on the characteristic of the individual one of the I/O user devices in the set.

In another embodiment, operations to determine 1202 the DRX settings for the I/O user devices in the set, include identifying a power-limited one of the I/O user devices in the set that is most limited by remaining operational time duration obtainable from a battery power supply, relative to other ones of the I/O user devices in the set. The operations to determine the DRX settings for the I/O user devices in the set are based on an operational characteristic of the power-limited one of the I/O user devices.

In some embodiments, input data is processed through machine learning model 252 at a defined frequency returning a set of I/O user devices that is predicted to become proximately located to one or more users. Reinforced training of the machine learning model 252 over time can include using feedback indicating which of the I/O user devices listed in the set were chosen and/or not chosen by the IODH 212 and/or by a user(s) as an interface for one or more communication services. Machine learning model parameters which have been updated through the training can be provided to one or more higher level machine learning models in a hierarchical set of machine learning models, such as described above (e.g., small geographical area layer of machine learning models, connected higher layer of machine learning models for larger geographic regions, etc.).

Example DRX settings which can be configured for an I/O user device are now explained in further detail below.

As an extension to the 3GPP LTE standards, the RAN 220 can configure the DRX settings for an I/O user device as to when to sleep and when to wake up. The DRX settings can be configured via an RRC (radio resource control) message such as RRC ConnectionReconfiguration or RRC Connection Setup. The DRX configuration can be sent under DRX-config structure under MAC-MainConfig:

```
-//-
rrcConnectionReconfiguration-r8
  dedicatedInfoNASList: 1 item
    Item 0
      DedicatedInfoNAS:
27bd5ad9de05620ec101050403696d730902000000000000...
        ....
  radioResourceConfigDedicated
    drb-ToAddModList: 1 item
      ...
    mac-MainConfig: explicitValue (0)
      explicitValue
        ul-SCH-Config
          ...
        drx-Config: setup (1)
          setup
            onDurationTimer: psf6 (5)
            drx-InactivityTimer: psf1920 (20)
            drx-RetransmissionTimer: psf16 (5)
            longDRX-CycleStartOffset: sf1280 (13)
              sf1280: 0
            shortDRX
              shortDRX-Cycle: sf10 (3)
              drxShortCycleTimer: 10 shortDRX-Cycles
        timeAlignmentTimerDedicated: infinity (7)
        phr-Config: setup (1)
          setup
            ...
        mac-MainConfig-v1020
    physicalConfigDedicated
  ...
-//-
The range of parameters being used is given below:
-//-
rrcConnectionReconfiguration
...
  ul-SCH-Config
  ...
DRX-Config ::= CHOICE {
      release   NULL,
      setup     SEQUENCE {
        onDurationTimer    ENUMERATED {
psf1, psf2, psf3, psf4, psf5, psf6, psf8, psf10, psf20, psf30, psf40, psf50, psf60, psf80,
psf100, psf200},
        drx-InactivityTimer ENUMERATED {
psf1, psf2, psf3, psf4, psf5, psf6, psf8, psf10, psf20, psf30, psf40, psf50, psf60, psf80,
psf100, psf200, psf300, psf500, psf750, psf1280, psf1920, psf2560, spare10, spare9,
spare8, spare7, spare6,
                spare5, spare4, spare3, spare2, spare1},
        drx-RetransmissionTimer ENUMERATED {
psf1, psf2, psf4, psf6, psf8, psf16, psf24, psf33},
        longDRX-CycleStartOffset  CHOICE {
                sf10  INTEGER(0..9),
                sf20  INTEGER(0..19),
                sf32  INTEGER(0..31),
                sf40  INTEGER(0..39),
                sf64  INTEGER(0..63),
                sf80  INTEGER(0..79),
                sf128 INTEGER(0..127),
                sf160 INTEGER(0..159),
                sf256 INTEGER(0..255),
                sf320 INTEGER(0..319),
                sf512 INTEGER(0..511),
                sf640 INTEGER(0..639),
```

-continued

```
            sf1024   INTEGER(0..1023),
            sf1280   INTEGER(0..1279),
            sf2048   INTEGER(0..2047),
            sf2560   INTEGER(0..2559)
        },
        shortDRX   SEQUENCE {
            shortDRX-Cycle ENUMERATED   {
            sf2, sf5, sf8, sf10, sf16, sf20,
            sf32, sf40, sf64, sf80, sf128, sf160,
            sf256, sf320, sf512, sf640},
        drxShortCycleTimer   INTEGER (1..16)
      }
-//-
```

In addition to above timers, the eNB MAC may also control I/O user device DRX by using a DRX Command as a MAC Control Element.

The I/O user device may inform the RAN 220 about DRX supportability, which the RAN 220 may enable or disable based on I/O user device capability and network operator's requirements. The I/O user device DRX support may be conveyed from the I/O user device to the RAN 220 (and therefrom to the user terminal emulation server 100) via a Capability Information message as shown below:

```
-//-
ueCapability Information-r8
  ue-CapabilityRAT-ContainerList: 1 item
    Item 0
      UE-CapabilityRAT-Container
        rat-Type: eutra (0)
        ueCapabilityRAT-Container:...
          UE-EUTRA-Capability
            accessStratumRelease: rel10 (2)
            ue-Category: 4
            pdcp-Parameters
              ..
            phyLayerParameters
              ....
            rf-Parameters
              ....
            measParameters
              ....
            featureGroupIndicators: ...
              0... .... = Indicator 1: ...
              .1.. .... = Indicator 2: ...
              ..1. .... = Indicator 3: ...
              ...1 .... = Indicator 4: ShortDRXcycle; Supported
              .... 1... = Indicator 5: LongDRXcycle;DRXcommandMAC CE;
Supported
              .... .1.. = Indicator 6: ....
-//-
```

The MAC entity may be configured by RRC with a DRX functionality that controls the I/O user device's PDCCH monitoring activity for the MAC entity's C-RNTI, TPC-PUCCH-RNTI, TPC-PUSCH-RNTI, Semi-Persistent Scheduling C-RNTI (if configured), UL Semi-Persistent Scheduling V-RNTI (if configured), eIMTA-RNTI (if configured), SL-RNTI (if configured), SL-V-RNTI (if configured), CC-RNTI (if configured), SRS-TPC-RNTI (if configured), and AUL C-RNTI (if configured).

When in RRC_CONNECTED, if DRX is configured, the MAC entity is allowed to monitor the PDCCH discontinuously using the DRX operation specified in this clause; otherwise the MAC entity monitors the PDCCH continuously.

When using DRX operation, the MAC entity shall also monitor PDCCH according to requirements found in other clauses of this specification.

RRC controls DRX operation by configuring the timers onDurationTimer, drx-Inactivity Timer, drx-Retransmission Timer (for HARQ processes scheduled using 1 ms TTI, one per DL HARQ process except for the broadcast process), drx-Retransmission TimerShortTTI (for HARQ processes scheduled using short TTI, one per DL HARQ process), drx-ULRetransmissionTimer (for HARQ processes scheduled using 1 ms TTI, one per asynchronous UL HARQ process), drx-ULRetransmission TimerShortTTI (for HARQ processes scheduled using short TTI, one per asynchronous UL HARQ process), the longDRX-Cycle, the value of the drxStartOffset and optionally the drxShortCycle Timer and shortDRX-Cycle. A HARQ RTT timer per DL HARQ process (except for the broadcast process) and UL HARQ RTT Timer per asynchronous UL HARQ process is also defined.

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI.

When using DRX operation, the MAC entity shall also monitor PDCCH according to requirements found in other clauses of this specification.

When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213.

RRC controls DRX operation by configuring the following parameters:

- drx-onDurationTimer: the duration at the beginning of a DRX cycle;
  - drx-SlotOffset: the delay before starting the drx-onDuration Timer;
  - drx-InactivityTimer: the duration after the PDCCH occasion in which a PDCCH indicates a new UL or DL transmission for the MAC entity;
  - drx-RetransmissionTimerDL (per DL HARQ process except for the broadcast process): the maximum duration until a DL retransmission is received;
  - drx-RetransmissionTimerUL (per UL HARQ process): the maximum duration until a grant for UL retransmission is received;
  - drx-LongCycleStartOffset: the Long DRX cycle and drx-StartOffset which defines the subframe where the Long and Short DRX cycle starts;
  - drx-ShortCycle (optional): the Short DRX cycle;
  - drx-ShortCycle Timer (optional): the duration the UE shall follow the Short DRX cycle;
  - drx-HARQ-RTT-TimerDL (per DL HARQ process except for the broadcast process): the minimum duration before a DL assignment for HARQ retransmission is expected by the MAC entity;
  - drx-HARQ-RTT-TimerUL (per UL HARQ process): the minimum duration before a UL HARQ retransmission grant is expected by the MAC entity;
  - ps-Wakeup (optional): the configuration to start associated drx-onDurationTimer in case DCP is monitored but not detected;
  - ps-TransmitOtherPeriodicCSI (optional): the configuration to report periodic CSI that is not L1-RSRP on PUCCH during the time duration indicated by drx-onDurationTimer in case DCP is configured but associated drx-onDuration Timer is not started;
  - ps-TransmitPeriodicL1-RSRP (optional): the configuration to transmit periodic CSI that is L1-RSRP on PUCCH during the time duration indicated by drx-onDuration Timer in case DCP is configured but associated drx-onDuration Timer is not started.

In some embodiments, the operations to configure 1106 the I/O user device to use the DRX settings for receiving downlink radio communications from the RAN related to the communication service, comprises configuring at least one of the following parameters used by the I/O user device for DRX operation, based on the DRX settings:

- drx-onDurationTimer for a duration at the beginning of a DRX cycle;
- drx-SlotOffset for a delay before starting the drx-onDurationTimer;
- drx-Inactivity Timer for a duration after a PDCCH occasion in which a PDCCH indicates a new uplink or downlink transmission for the I/O user device;
- drx-RetransmissionTimerDL for a maximum duration until a downlink retransmission is received by the I/O user device;
- drx-RetransmissionTimerUL for a maximum duration until a grant for uplink retransmission is received by the I/O user device;
- drx-LongCycleStartOffset for a subframe where the long DRX cycle starts;
- drx-ShortCycle for a Short DRX cycle;
- drx-ShortCycleTimer for a duration the I/O user device shall follow a Short DRX cycle;
- drx-HARQ-RTT-TimerDL for a minimum duration before a downlink assignment for Hybrid Automatic Repeat Request, HARQ, retransmission is expected by the I/O user device; and
- drx-HARQ-RTT-TimerUL for a minimum duration before an uplink HARQ retransmission grant is expected by the I/O user device.

Example DRX Settings Based on Proximity Characteristics—

In a scenario where the user terminal emulation server 100, e.g., the module 250 using the machine learning model 252, has identified individual I/O user devices or a cluster of I/O user devices being frequently used. The server 100 may determine that the user interaction with the I/O user device (s) may be degraded if the I/O user device(s) are excessively in sleep mode (too frequently and/or for an excessive duration). In some embodiment, the I/O user device(s) that are predicted be likely "next" to be proximately located to the user, e.g., having a higher probability, can be configured with shorter DTX cycles in order to be more responsive (i.e. wake up at higher periodicity to listen for paging information from its serving eNB) for any inbound data.

A corresponding set of "frequently used IOD" DRX parameters may be characterized by:

| | |
|---|---|
| Time until DRX enabled: | 200 ms |
| DRX Cycle Time Short: | 40 ms |
| DRX Cycle Time Long: | 80 ms |
| On Duration: | 10 ms |
| Time Alignment: | INF |
| Time until idle: | NaN |

DRX is entered after 200 ms and the I/O user device(s) must listen to any incoming downlink assignments (from the user terminal emulation server 100 or the serving eNB, depending on the communications) every 10 ms during each cycle. During the time alignment, the I/O user device(s) must keep transmitting its status and measurement information to the serving eNB. This long time-alignment often consumes the I/O user device(s) power, battery, and renders radio interface load.

In a related scenario where an individual the I/O user device or cluster of the I/O user devices is determined being less frequently used, another "less frequently used IOD" DRX setting allowing the I/O user device(s) to faster revert into sleep, may be configured and characterized by:

| 100 ms | |
|---|---|
| Time until DRX enabled: | 100 ms |
| DRX Cycle Time Short: | 40 ms |
| DRX Cycle Time Long: | 320 ms |
| On Duration: | 10 ms |
| Time Alignment: | 1.92 s |
| Time until idle: | 30 s |

With an DRX entry time of 100 ms, the I/O user device(s) with this DRX setting enter DRX faster than with the "frequently used IOD" scenario. With a significantly shorter time alignment requirements of 1.92 s the I/O user device(s) are not be required to keep transmitting their status and measurement information to the serving eNB as long as with the previous configuration, and after 30 s with no-data transmission, the network allows the I/O user device(s) to enter a sleep state. In 5G operations this could involve a change of RRC state from RRC_CONNECTED to RRC_IDLE, thus removing the radio air interface connectivity.

Apart from the above exemplified DRX parameters (also referred to as settings), the user terminal emulation server 100 and the eNB may select and determine use of other parameters that provide desired DRX characteristics (e.g. "often awake" or "fast to deep-sleep") to the selected I/O user device(s).

Further operations of the user terminal emulation server 100 in accordance with some other embodiments are explained below.

The user terminal emulation server 100 may itself determine when an I/O user device should be configured with new DRX settings to provide improved performance based on characteristics of predicated I/O user device-clustering and mobility, e.g. determined from media service characteristics for one I/O user device or group of I/O user devices in relation to some service threshold. The exchange of DRX settings can be done in different ways, such as:

1) The user terminal emulation server 100 provides the DRX settings directly to the RAN 220 (e.g., eNB, gNB) serving the one or more I/O user devices to be configured. The RAN 220 updates the connection with the I/O user device and configures DRX with these settings; or
2) The user terminal emulation server 100 is aware of a set of DRX parameters. The RAN 220 (e.g., eNB, gNB) is preconfigured with a similar list. The user terminal emulation server 100 provides a pointer to one of the set of DRX settings in the list to notify the RAN 220 which set of DRX parameters should be used to configure one or more I/O user devices. An I/O user device (e.g., UE) assistance message can include a pointer to a set within the list so that the RAN 220 selects the correct set of DRX settings.

The user terminal emulation server 100 may in a further embodiment also provide the RAN 220 (e.g., eNB, gNB) serving the one or more I/O user devices with a set of RRC state transition parameters as determined by the user terminal emulation server 100 in correspondence to the I/O user device-clustering characteristics and use patterns. This information may be carried in the RRC protocol messages or via some RAN to application collaboration channel.

The user terminal emulation server 100 may in a further embodiment also send messages to the I/O user device to bring it up to an active RRC state or to prevent the I/O user device from going into a less active RRC state, such as RRC Idle or RRC inactive. The message generation interval and size may also be used based on the information obtained from the I/O user device (UE) or the mobile network, e.g. CN via an AF.

As explained above, in a 3GPP LTE mobile network the RRC protocol can be used to inform a UE about DRX settings and initiates the UE to transfer between RRC states, or the transfer may be performed implicitly by timer configurations. The RRC protocol resides in the RAN 220, e.g. eNB or gNB.

The user terminal emulation server 100 informs the network regarding suitable DRX setting and/or RRC setting for an I/O user device (UE). The user terminal emulation server 100 may communicate this information via an OAM system interface, or via a CN application interface, or even directly towards a RAN interface.

Via the CN the user terminal emulation server 100 would interface with the Application Function (AF) that would take the information further into the functionality of the CN. The AF would, if needed, translate the information received from the user terminal emulation server 100 to something the CN understands, which CN via e.g. the PCRF and AMF, or RAN OAM trickles down to the RAN that would update the settings, e.g. DRX, of those particular I/O user devices that are the subject of the information received by the AF. The trickle-down may include modifying the bearer used by the RAN towards the I/O user device (UE), or updating the bearer part of the UE context.

Similarly, the user terminal emulation server 100 may interface the OAM of the network. The OAM of the RAN will then update the configuration of the I/O user device (UE) via internal functionality.

The information the user terminal emulation server 100 sends to the network, via OAM or AF, or directly to RAN, can be translated by the network to corresponding (DRX) settings or be actual DRX settings.

Example operations for signaling DRX settings are explained below.

Proximity Prediction to DRX Setting Translation—

In one embodiment, the user terminal emulation server 100 uses the 3GPP RRC protocol to communicate with a RAN. The user terminal emulation server 100 determines that a DRX setting should be configured for a group of I/O user devices. The user terminal emulation server 100 divides the group of I/O user devices into, e.g., three sub-groups, 1 "next" (to be moved into next by usertag)
2 "soon" (plausible to be used after "next")
3 "later" (estimated/determined to occur after/later than "soon"))

The user terminal emulation server 100 generates for the sub-group 1 "next" a set of DRX settings, such as:

| | |
|---|---|
| onDuration Timer | psf_i1 |
| drx-InactivityTimer | psf_i2 |
| drx-RetransmissionTimer | psf_i3 |
| longDRX-CycleStartOffset | sf_i1 |
| shortDRX SEQUENCE {shortDRX-Cycle sf_i2} | |
| drxShortCycleTimer | sf_i3 |

The user terminal emulation server 100 generates for the sub-group 2 "soon" a set of DRX settings, such as:

| | |
|---|---|
| onDurationTimer | psf_j1 |
| drx-InactivityTimer | psf_j2 |
| drx-RetransmissionTimer | psf_j3 |
| longDRX-CycleStartOffset | sf_j1 |
| shortDRX SEQUENCE {shortDRX-Cycle sf_j2} | |
| drxShortCycleTimer | sf_j3 |

In another embodiment, the user terminal emulation server 100 does not use the 3GPP RRC protocol when communicating with the RAN. The user terminal emulation server 100 divides a group of I/O user devices into e.g. three "activity characteristics sub-groups", 1 "next" (to be moved into next by usertag)
"time and response metric requirement" #1
2 "soon" (plausible to be used after "next")
"time and response metric requirement" #2
3 "later" (estimated/determined to occur after/later than "soon")
"time and response metric requirement" #3

The user terminal emulation server 100 provides attributes of activity characteristics groups to a receiving (CN) node in the telecommunication network, such as to an Application Function (AF).

Proximity prediction based IODRRCConnectionReconfiguration is now explained.

Information of "activity characteristics sub-groups" respective "time and response metric requirement" for respective IOD ("I/O user device") sub-group identifier may be provided (transmitted) to the CN. The CN may translate, for example, "time and response metric requirement" #1 into DRX associated parameters, such as:

| | |
|---|---|
| onDurationTimer | psf_i1 |
| drx-InactivityTimer | psf_i2 |
| drx-RetransmissionTimer | psf_i3 |
| longDRX-CycleStartOffset | sf_i1 |
| shortDRX SEQUENCE { shortDRX-Cycle sf_i2} | |
| drxShortCycleTimer | sf_i3 |

Alternatively, the user terminal emulation server 100 may translate "activity characteristics sub-groups" into a set of DRX settings that may be conveyed to CN as a request for enabled RANIODrrcConnectionReconfiguration per respective I/O user device group identifier and:

- Puts <message name> into MicoServiceRRCConnectionReconfiguration message
- Look-up I/O user device group identifier into TIMSI/IMSI/UE identity
- Forwards message to node X . . . and to MME . . . to eNB/gNB
- eNB/gNB receives MicoServiceRRCConnectionReconfiguration message, and
  - checks validity of parameter range (may be accomplished in previous step in CN micro service reception step)
  - acknowledges application thereof to upper layers (or NACK with cause value)
- I/O user device receives and
  - Applies from higher layer provided parameter settings . . .
- Higher layers receive MicoServiceRRCConnectionReconfiguration response from serving eNB/gNB(s), and
  - Forwards to CN AF
- CN AF responds to user terminal emulation server 100 with RANIODrrcConnectionReconfiguration complete/reject
  - with cause value if applicable Possible further useful information exchanges are now explained.

The user terminal emulation server 100 transmits I/O user device RAN capability requests to CN/OAM. The CN/OAM responds with list, e.g., of:

- I/O user device DRX settings
  - I/O user device group identifier
  - <format> or <format><value range>
- I/O user device power setting (since may be useful to understand how I/O user device clusters are associated)
  - I/O user device group identifier
  - <format> or <format><value range>

The user terminal emulation server 100 to base station (eNB/gNB) signaling message, and/or termination points in EPC/5GC, such as the following message: "user terminal emulation server 100 Request on updated DRX settings for I/O user devices to radio base station (eNB, gNB) via CN"

In this embodiment, the user terminal emulation server 100 in conjunction with the proximity-clustering ML-model managing server provides the MME/serving eNBs with a request that selected I/O user devices may be targeted with updated DRX settings according to an user terminal emulation server 100/ML-model-based clustering decision.

The network, e.g. AF or OAM (or other relevant node), receives a DRX_message and based on selected I/O user devices determines the serving base station for individual devices of the cluster of I/O user devices. Translation of the IDOH message into instructions/format that the RAN can understand may furthermore be needed. However, upon reception of the information in a DRX message from the user terminal emulation server 100, the serving base station may:

- translate said user terminal emulation server 100 message information to an RRCReconfigurationRequest message, and
- select DRX-Config parameters corresponding to the intent of the received DRX_message
  - i.e. corresponding to "keep awake" or "put to sleep", or similar, and,
- transmit said updated DRX settings in an RRCReconfigurationRequest message to selected I/O user devices.

Operations for the user terminal emulation server 100 to construct a RRCReconfigurationRequest message passed to the eNB via CN are now explained.

The user terminal emulation server 100 itself may compile an RRCReconfigurationRequest message with relevant DRX parameter settings selected in accordance with the determined I/O user device activity intent, and then transmit the message to the network. Hence, the network may thus not need any translation of the message information but can pass to the serving RAN (e.g., eNB or gNB) of the I/O user devices. A new or additional message header may be required to indicate use of the user terminal emulation server 100-compiled pass-through-downwards message.

An I/O user device DRX reconfiguration response in accordance with some embodiments, can include the I/O user device responding to the serving RAN (e.g., eNB or gNB) with a RRCConnectionReconfigurationComplete message after the I/O user device has executed all conveyed commands.

Cloud Implementation

Some or all operations described above as being performed by the user terminal emulation server 100 or the I/O user devices 130 may alternatively be performed by the other one, and/or by another node that is part of a cloud computing resource. For example, those operations can be performed as a network function that is close to the edge, such as in a cloud server or a cloud resource of a telecommunications network operator, e.g., in a CloudRAN or a core network, and/or may be performed by a cloud server or a cloud resource of a media provider, e.g., iTunes service provider or Spotify service provider.

Example I/O User Device and User Terminal Emulation Server

Figure 8:
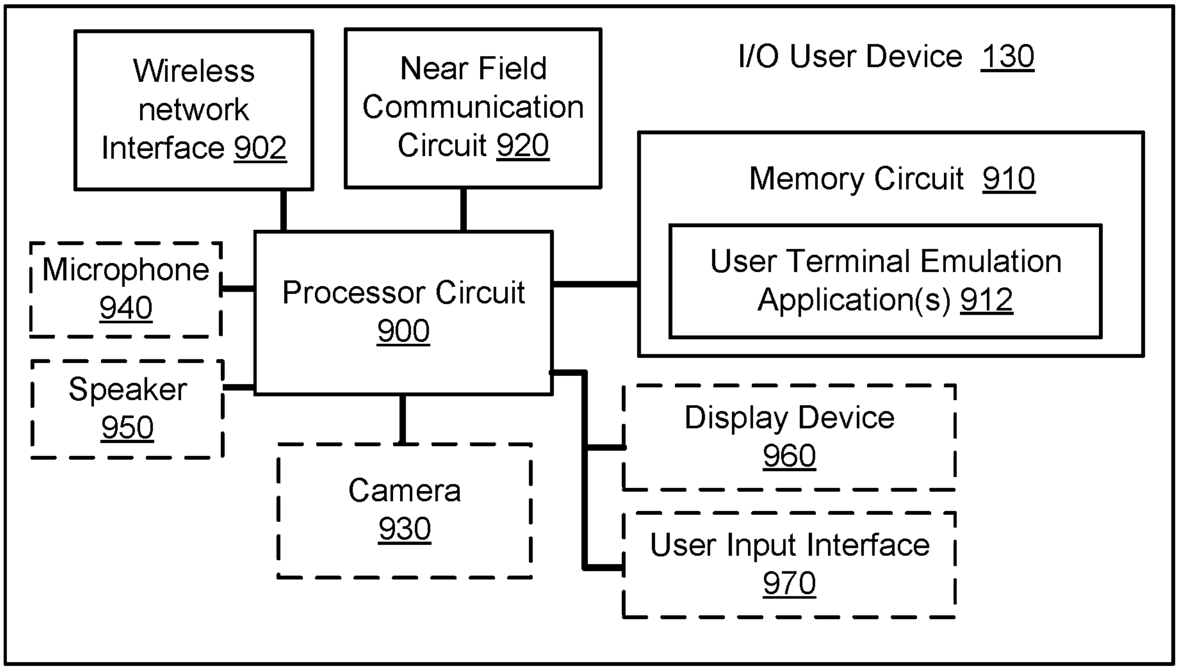
FIG. 8 is a block diagram of components of an I/O user device which are configured to operate in accordance with some embodiments.

FIG. 8 is a block diagram of components of an I/O user device 130 which are configured to operate in accordance with some embodiments. The I/O user device 130 can include a wired/wireless network interface circuit 902, a near field communication circuit 920, at least one processor circuit 900 (processor), and at least one memory circuit 910 (memory). The processor 900 is connected to communicate with the other components. The memory 910 stores program code 912 that is executed by the processor 900 to perform operations disclosed herein. The processor 900 may include one or more data processing circuits (e.g., microprocessor and/or digital signal processor), which may be collocated or distributed across one or more data networks. The processor 900 is configured to execute the program code 912 in the memory 910, described below as a computer readable medium, to perform some or all of the operations and methods for one or more of the embodiments disclosed herein for a mobile electronic device. The I/O user device 130 can include one or more UI devices, including without limitation, a microphone 940, a speaker 950, a camera 930, and display device 960, and a user input interface 970.

Figure 9:
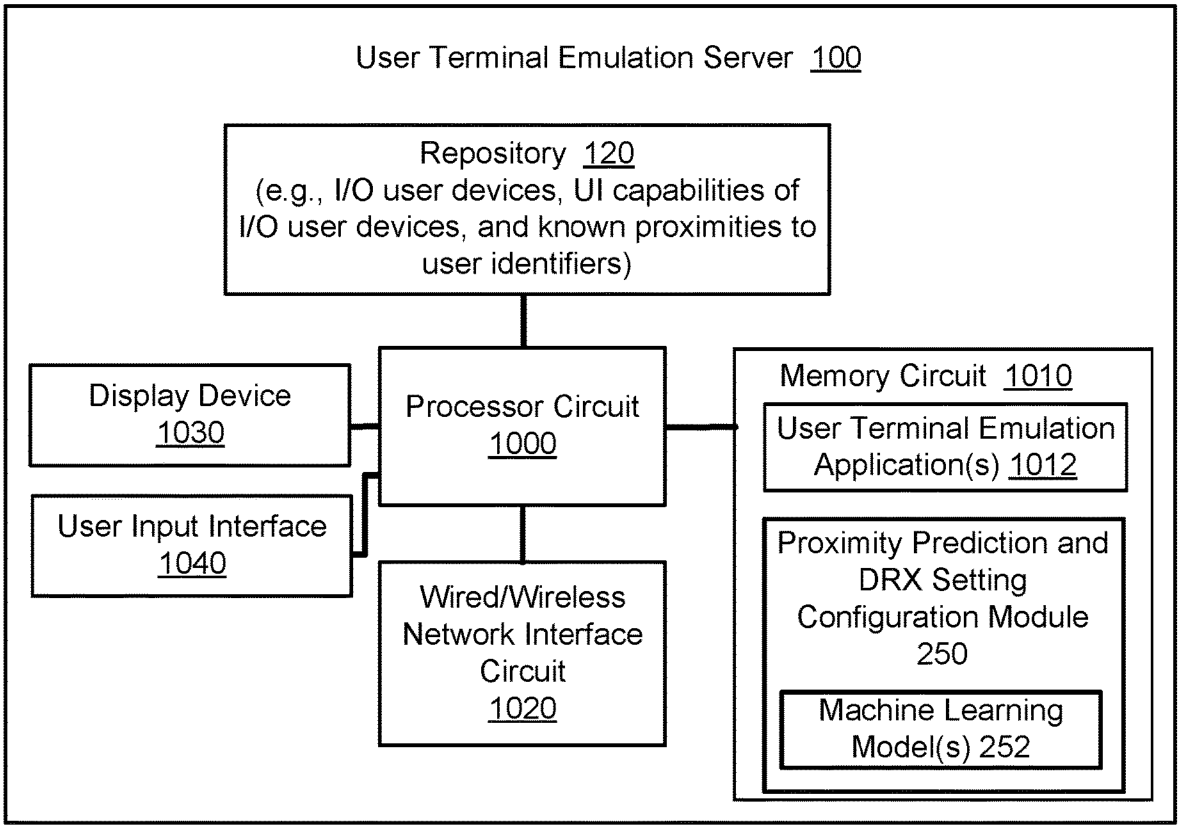
FIG. 9 is a block diagram of components of a user terminal emulation server that are configured to operate in accordance with some embodiments of the present disclosure.

FIG. 9 is a block diagram of components of a user terminal emulation server 100 which are configured to operate in accordance with some embodiments. The user terminal emulation server 100 can include a wired/wireless network interface circuit 1020, a repository 120 (e.g., listing I/O user devices, UI capabilities of the I/O user devices, known proximities to user identifiers, etc.), a display device 1030, a user input interface 1040 (e.g., keyboard or touch sensitive display), at least one processor circuit 1000 (processor), and at least one memory circuit 1010 (memory). The processor 1000 is connected to communicate with the other components. The memory 1010 stores user terminal emulation application 1012 that is executed by the processor 1000 to perform operations disclosed herein. The memory 1010 also stores a proximity prediction and DRX setting configuration module 250. In some embodiments, the module 250 includes a machine learning model 252. The processor 1000 may include one or more data processing circuits (e.g., microprocessor and/or digital signal processor), which may be collocated or distributed across one or more data networks. The processor 1000 is configured to execute computer program instructions in the memory 1010, described below as a computer readable medium, to perform some or all of the operations and methods for one or more of the embodiments disclosed herein for a mobile electronic device.

Abbreviations

3GPP 3rd Generation Partnership Project
5GC 5G Core
AF Application Function
AMF Access and Mobility Management Function
App Application, i.e. program
CN Core Network
CNN Convolutional Neural Network
DNN Deep Neural Network
DRX Discontinuous Reception
eNB Evolved Node B (a.k.a. RBS, Radio Base Station)
EPC Evolved Packet Core
gNB eNB for 5G
GNSS Global Navigation Satellite System
GPS Global Positioning System
GW Gateway
HARQ Hybrid Automatic Repeat Request
HO Handover
ICMP Internet Control Message Protocol
IOD Input/Output User Device
IODH Input Output Device Handler
ITU International Telecommunication Union
MME Mobility Management Entity
RAN Radio Access Network
RFID Radio-Frequency IDentification
RRC Radio Resource Control
RTP Real Time Protocol
RTCP Real Time Control Protocol
NTP Network Time Protocol
SDP Session Description Protocol
SR Sender Response
TTI Transmission Time Interval
UE User equipment

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A user terminal emulation server for providing a communication service through one or more input and/or output, I/O, user devices to a user, wherein the user terminal emulation server comprises at least one processor circuit and at least one memory circuit storing program code that is executed by the at least one processor circuit to cause the user terminal emulation server to:

register user information with a network entity providing the communication service;

predict likelihood the user will become proximately located to an I/O user device;

determine discontinuous reception, DRX, settings based on the predicted likelihood the user will become proximately located to the I/O user device; and configure the I/O user device, using radio resource control, RRC, signaling, to use the DRX settings for receiving downlink radio communications from a radio access network, RAN, which are related to the communication service.

2. The user terminal emulation server of claim 1, wherein:

the prediction of likelihood the user will become proximately located to the I/O user device, comprises estimating time until the user will become proximately located to the I/O user device; and the DRX settings are determined based on the estimated time.

3. The user terminal emulation server of claim 2, further configured to:

predict the likelihood that the user will become proximately located to a first I/O user device based on estimating the user will become proximately located to the first I/O user device in a first elapsed time;

predict the likelihood that the user will become proximately located to a second I/O user device based on estimating the user will become proximately located to the second I/O user device in a second elapsed time which is greater than the first elapsed time;

predict the likelihood that the user will become proximately located to a third I/O user device based on estimating the user will become proximately located to the third I/O user device in a third elapsed time which is greater than the second elapsed time;

determine first DRX settings for configuring the first I/O user device based on the first elapsed time;

determine second DRX settings for configuring the second I/O user device based on the second elapsed time, wherein the second DRX settings configure the second I/O user device to operate with a greater ratio of lower power consumption mode time relative to higher power consumption mode time compared to the first I/O user device configured by the first DRX settings; and determine third DRX settings for configuring the third I/O user device based on the third elapsed time, wherein the third DRX settings configure the third I/O user device to operate with a greater ratio of lower power consumption mode time relative to higher power consumption mode time compared to the second I/O user device configured by the second DRX settings, wherein during the lower power consumption mode the first, second, and third I/O user devices cannot receive downlink radio communications from the RAN, and wherein during the higher power consumption mode the first, second, and third I/O user devices can receive downlink radio communications from the RAN.

4. The user terminal emulation server of claim 1, wherein:

the prediction of likelihood the user will become proximately located to the I/O user device, comprises generating a set of proximity probability values indicating likelihood that the user will become proximately located to the I/O user device as a function of a set of different elapsed times; and the DRX settings are determined based on the set of proximity probability values.

5. The user terminal emulation server of claim 1, wherein to predict likelihood the user will become proximately located to the I/O user device, the user terminal emulation server is configured to:

process information indicating present proximity of the user to another I/O user device through a machine learning model that has been trained based on time ordered sequences of I/O user devices that have been historically observed to become proximately located to users; and predict likelihood the I/O user device will become proximately located to the user based on output of the machine learning model from processing the information.

6. The user terminal emulation server of claim 1, wherein to predict likelihood the user will become proximately located to the I/O user device, the user terminal emulation server is configured to:

process a present location of the user through a machine learning model that has been trained based on locations of the I/O user devices; and predict likelihood the user will become proximately located to the I/O user device based on an output of the machine learning model from processing the present location of the user.

7. The user terminal emulation server of claim 1, further configured to:

process a predicted next location of the user through a machine learning model that has been trained based on historically observed I/O user devices that have been selected for use by users who were proximately located to the next location while using the communication service, to output a set of the I/O user devices at the next location which can be used by the user for the communication service;

determine DRX settings for the I/O user devices in the set; and configure the I/O user devices in the set to use the DRX settings for receiving the downlink radio communications from the RAN related to the communication service.

8. The user terminal emulation server of claim 7, wherein:

the determination of the DRX settings for the I/O user devices in the set, comprises determining a set of DRX settings for individual ones of the I/O user devices in the set based on an operational characteristic of the individual one of the I/O user devices in the set; and the configuration of the I/O user devices in the set to use the DRX settings for receiving the downlink radio communications from the RAN related to the communication service, comprises:

for individual ones of the I/O user devices in the set, communicating one of the sets of DRX settings to the individual one of the I/O user devices in the set which was determined based on the characteristic of the individual one of the I/O user devices in the set.

9. The user terminal emulation server of claim 7, wherein the determination of the DRX settings for the I/O user devices in the set, comprises:

identifying a power-limited one of the I/O user devices in the set that is most limited by remaining operational time duration obtainable from a battery power supply, relative to other ones of the I/O user devices in the set; and determining the DRX settings for the I/O user devices in the set based on an operational characteristic of the power-limited one of the I/O user devices.

10. The user terminal emulation server of claim 1, wherein the configuration of the I/O user device to use the DRX settings for receiving downlink radio communications from the radio access network, comprises:

communicating the DRX settings and identity of the I/O user device to the RAN or to an intermediary network node which translates the DRX settings into translated DRX settings provided to the RAN, for configuring DRX operation of the I/O user device.

11. The user terminal emulation server of claim 10, wherein the communication of the DRX settings and identity of the I/O user device to the RAN or to the intermediary network node which translates the DRX settings into translated DRX settings provided to the RAN, for configuring DRX operation of the I/O user device, comprises:

communicating a pointer to the RAN or to the intermediary network node that references a set of DRX settings among a repository of DRX settings which are preconfigured in the RAN or preconfigured in the intermediary network node, to be used to configured DRX operation of the I/O user device that is identified.

12. The user terminal emulation server of claim 1, wherein the configuration of the I/O user device to use the DRX settings for receiving downlink radio communications from the radio access network, comprises:

communicating the DRX settings to the I/O user device using radio resource control, RRC, signaling through the RAN.

13. The user terminal emulation server of claim 1, further configured to:

determine the DRX settings for the I/O user device based on information received from the I/O user device indicating at least one of the following operational characteristics of the I/O user device: downlink streaming audio playout capability; downlink streaming video display capability; uplink streaming microphone audio capability; and uplink streaming camera video capability.

14. The user terminal emulation server of claim 1, wherein the configuring of the I/O user device to use the DRX settings for receiving downlink radio communications from the RAN comprises:

configuring at least one of the following parameters used by the I/O user device for DRX operation, based on the DRX settings:

drx-onDurationTimer for a duration at the beginning of a DRX cycle;

drx-SlotOffset for a delay before starting the drx-onDurationTimer;

drx-InactivityTimer for a duration after a PDCCH occasion in which a PDCCH indicates a new uplink or downlink transmission for the I/O user device;

drx-RetransmissionTimerDL for a maximum duration until a downlink retransmission is received by the I/O user device;

drx-RetransmissionTimerUL for a maximum duration until a grant for uplink retransmission is received by the I/O user device;

drx-LongCycleStartOffset for a subframe where the long DRX cycle starts;

drx-ShortCycle for a Short DRX cycle;

drx-ShortCycleTimer for a duration the I/O user device shall follow a Short DRX cycle;

drx-HARQ-RTT-TimerDL for a minimum duration before a downlink assignment for Hybrid Automatic Repeat Request, HARQ, retransmission is expected by the I/O user device; and drx-HARQ-RTT-TimerUL for a minimum duration before an uplink HARQ retransmission grant is expected by the I/O user device.

15. The user terminal emulation server of claim 1, wherein to determine the DRX settings based on the predicted likelihood the user will become proximately located to the I/O user device, the user terminal emulation server is configured to:

send to the RAN a query message requesting identification of current DRX settings configured for the I/O user device that can be changed; and determine the DRX settings based on content of a response message from the RAN to the query message and based on the predicted likelihood the user will become proximately located to the I/O user device.

16. A method of a user terminal emulation server for providing a communication service through one or more input and/or output, I/O, user devices to a user, the method comprising:

registering user information with a network entity providing the communication service;

predicting likelihood the user will become proximately located to an I/O user device;

determining discontinuous reception, DRX, settings based on the predicted likelihood the user will become proximately located to the I/O user device; and configuring the I/O user device, using radio resource control, RRC, signaling, to use the DRX settings for receiving downlink radio communications from a radio access network, RAN, which are related to the communication service.

17. The method of claim 16, wherein:

the prediction of likelihood the user will become proximately located to the I/O user device, comprises estimating time until the user will become proximately located to the I/O user device; and the DRX settings are determined based on the estimated time.

18. The method of claim 17, further comprising:

predicting the likelihood that the user will become proximately located to a first I/O user device based on estimating the user will become proximately located to the first I/O user device in a first elapsed time;

predicting the likelihood that the user will become proximately located to a second I/O user device based on estimating the user will become proximately located to the second I/O user device in a second elapsed time which is greater than the first elapsed time;

predicting the likelihood that the user will become proximately located to a third I/O user device based on estimating the user will become proximately located to the third I/O user device in a third elapsed time which is greater than the second elapsed time;

determining first DRX settings for configuring the first I/O user device based on the first elapsed time;

determining second DRX settings for configuring the second I/O user device based on the second elapsed time, wherein the second DRX settings configure the second I/O user device to operate with a greater ratio of lower power consumption mode time relative to higher power consumption mode time compared to the first I/O user device configured by the first DRX settings; and determining third DRX settings for configuring the third I/O user device based on the third elapsed time, wherein the third DRX settings configure the third I/O user device to operate with a greater ratio of lower power consumption mode time relative to higher power consumption mode time compared to the second I/O user device configured by the second DRX settings, wherein during the lower power consumption mode the first, second, and third I/O user devices cannot receive downlink radio communications from the RAN, and wherein during the higher power consumption mode the first, second, and third I/O user devices can receive downlink radio communications from the RAN.

19. The method of claim 16, wherein:

the predicting likelihood the user will become proximately located to the I/O user device, comprises generating a set of proximity probability values indicating likelihood that the user will become proximately located to the I/O user device as a function of a set of different elapsed times; and the DRX settings are determined based on the set of proximity probability values.

20. The method of claim 16, wherein the predicting likelihood the user will become proximately located to the I/O user device, comprises:

processing information indicating present proximity of the user to another I/O user device through a machine learning model that has been trained based on time ordered sequences of I/O user devices that have been historically observed to become proximately located to users; and predicting likelihood the I/O user device will become proximately located to the user based on output of the machine learning model from processing the information.

21. The method of claim 16, wherein the predicting likelihood the user will become proximately located to the I/O user device, comprises:

processing a present location of the user through a machine learning model that has been trained based on locations of the I/O user devices; and predicting likelihood the user will become proximately located to the I/O user device based on an output of the machine learning model from processing the present location of the user.

22. The method of claim 16, further comprising:

processing a predicted next location of the user through a machine learning model that has been trained based on historically observed I/O user devices that have been selected for use by users who were proximately located to the next location while using the communication service, to output a set of the I/O user devices at the next location which can be used by the user for the communication service;

determining DRX settings for the I/O user devices in the set; and configuring the I/O user devices in the set to use the DRX settings for receiving the downlink radio communications from the RAN related to the communication service.

23. The method of claim 22, wherein:

the determining DRX settings for the I/O user devices in the set, comprises determining a set of DRX settings for individual ones of the I/O user devices in the set based on an operational characteristic of the individual one of the I/O user devices in the set; and the configuring the I/O user devices in the set to use the DRX settings for receiving the downlink radio communications from the RAN related to the communication service, comprises:

for individual ones of the I/O user devices in the set, communicating one of the sets of DRX settings to the individual one of the I/O user devices in the set which was determined based on the characteristic of the individual one of the I/O user devices in the set.

24. The method of claim 22, wherein the determining DRX settings for the I/O user devices in the set, comprises:

identifying a power-limited one of the I/O user devices in the set that is most limited by remaining operational time duration obtainable from a battery power supply, relative to other ones of the I/O user devices in the set; and determining the DRX settings for the I/O user devices in the set based on an operational characteristic of the power-limited one of the I/O user devices.

25. The method of claim 16, wherein the configuring the I/O user device to use the DRX settings for receiving downlink radio communications from the RAN related to the communication service, comprises:

communicating the DRX settings and identity of the I/O user device to the RAN or to an intermediary network node which translates the DRX settings into translated DRX settings provided to the RAN, for configuring DRX operation of the I/O user device.

26. The method of claim 25, wherein the communicating the DRX settings and identity of the I/O user device to the RAN or to an intermediary network node which translates the DRX settings into translated DRX settings provided to the RAN, for configuring DRX operation of the I/O user device, comprises:

communicating a pointer to the RAN or to the intermediary network node that references a set of DRX settings among a repository of DRX settings which are preconfigured in the RAN or preconfigured in the intermediary network node, to be used to configured DRX operation of the I/O user device that is identified.

* * * * *